(12) United States Patent
Eyler et al.

(10) Patent No.: US 10,991,159 B2
(45) Date of Patent: *Apr. 27, 2021

(54) PROVIDING A VIRTUAL REALITY TRANSPORTATION EXPERIENCE

(71) Applicant: Lyft, Inc., San Francisco, CA (US)

(72) Inventors: Ethan Duncan Eyler, San Francisco, CA (US); Martin Conte MacDonell, San Francisco, CA (US); Taggart Matthiesen, San Francisco, CA (US); Jesse Jones McMillin, San Francisco, CA (US); Robert Earl Rasmusson, Jr., San Francisco, CA (US); Mark David Teater, Oakland, CA (US)

(73) Assignee: LYFT, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,688

(22) Filed: Jul. 6, 2020

(65) Prior Publication Data

US 2020/0364931 A1    Nov. 19, 2020

Related U.S. Application Data

(63) Continuation of application No. 16/512,226, filed on Jul. 15, 2019, now Pat. No. 10,706,620, which is a (Continued)

(51) Int. Cl.
*G06T 17/05*    (2011.01)
*G06F 3/01*    (2006.01)
(Continued)

(52) U.S. Cl.
CPC .............. *G06T 17/05* (2013.01); *G01C 21/00* (2013.01); *G01C 21/3407* (2013.01);
(Continued)

(58) Field of Classification Search
None
See application file for complete search history.

(56) References Cited

U.S. PATENT DOCUMENTS 10,354,440 B2    7/2019    Eyler et al.
2011/0313647 A1    12/2011    Koebler et al.
(Continued)

OTHER PUBLICATIONS

U.S. Appl. No. 15/650,838, Mar. 8, 2018, Office Action.
(Continued)

*Primary Examiner* — Jeffrey J Chow
(74) *Attorney, Agent, or Firm* — Keller Jolley Preece

(57) ABSTRACT

The present disclosure is directed toward systems and methods for a virtual reality transportation system. In particular, the systems and methods described herein present a virtual reality experience including a virtual environment for display to a passenger including virtual inertial interactions that correspond to real-world inertial forces that a passenger experiences while riding in a vehicle. Additionally, the systems and methods described herein analyze historical sensory data to predict inertial forces that the passenger will experience while riding in the vehicle. The systems and methods also generate a virtual sensory view for display to a passenger to represent what an autonomous transportation vehicle sees by way of a sensor suite used for navigation.

20 Claims, 12 Drawing Sheets

Related U.S. Application Data continuation of application No. 15/650,838, filed on Jul. 14, 2017, now Pat. No. 10,354,440.

(51) Int. Cl.
*G06T 15/20* (2011.01)
*G06T 19/00* (2011.01)
*G01C 21/34* (2006.01)
*G01C 21/00* (2006.01)
*G06T 15/00* (2011.01)
*G06T 17/00* (2006.01)

(52) U.S. Cl.
CPC .............. *G06F 3/011* (2013.01); *G06T 15/20* (2013.01); *G06T 19/006* (2013.01); *G06T 15/00* (2013.01); *G06T 17/00* (2013.01); *G06T 19/00* (2013.01)

(56) References Cited

U.S. PATENT DOCUMENTS

| | | |
|---|---|---|
| 2014/0025286 A1 | 1/2014 | Donovan et al. |
| 2014/0346722 A1 | 11/2014 | Bradshaw et al. |
| 2017/0103571 A1 | 4/2017 | Beaurepaire |
| 2018/0040162 A1 | 2/2018 | Donnelly et al. |
| 2018/0040163 A1 | 2/2018 | Donnelly et al. |

OTHER PUBLICATIONS

U.S. Appl. No. 15/650,838, Sep. 21, 2018, Office Action.
U.S. Appl. No. 15/650,838, Oct. 30, 2018, Office Action.
U.S. Appl. No. 15/650,838, May 1, 2019, Notice of Allowance.
U.S. Appl. No. 16/512,226, Jan. 7, 2020, Office Action.
U.S. Appl. No. 16/512,226, Apr. 2, 2020, Notice of Allowance.

PROVIDING A VIRTUAL REALITY TRANSPORTATION EXPERIENCE

CROSS-REFERENCE TO RELATED APPLICATIONS

This application is a continuation of U.S. patent application Ser. No. 16/512,226, filed on Jul. 15, 2019, which is a continuation of U.S. patent application Ser. No. 15/650,838, filed on Jul. 14, 2017 which issued as U.S. Pat. No. 10,354,440. Each of the aforementioned applications are hereby incorporated by reference in their entirety.

BACKGROUND

Transportation services (e.g., ride share services, taxi services, etc.) provide a way for passengers to travel from one place to another with relative ease. For example, ride share transportation services enable passengers to request transportation from nearly any location and at almost any time. By assigning a nearby driver to pick up a requesting passenger, transportation services generally provide an added level of convenience to the passenger, without the passenger relying on a bus schedule, navigating to a subway station, or even owning a vehicle. To illustrate, a ride share transportation service may enable a passenger to request a driver for roadside pickup and to deliver the passenger to a desired destination (e.g., as the passenger designates by way of a mobile device). The ride share system then matches and assigns a driver for the user based on location and other factors to quickly and efficiently transport the passenger. With the advancement of smartphones, requesting a driver is even simpler than before. For instance, a passenger can utilize a mobile application to request a driver, and, via the location information associated with the smartphone, the ride share system can match a nearby driver to the request to pick up the passenger and deliver the passenger to a desired destination, all more efficiently than in times past. However, while conventional transportation systems do provide some benefits, conventional transportation systems nonetheless have several disadvantages.

For example, conventional transportation systems create a sense of monotony in passengers. In particular, conventional systems provide experiences that are repetitive and that prevent passengers from enjoying a more engaging ride experience. To illustrate, a passenger in a conventional system does little more than request a ride, wait for pickup, travel with a driver, and pay for the service—and some passengers travel the same roads routinely to commute to and from work, for example. Additionally, conventional transportation systems isolate passengers. In other words, conventional systems communicate on a user-by-user basis, effectively separating each individual passenger from one another. Conventional systems treat each passenger ride as separate events and provide ride-related information such as maps, time-to-destination estimations, etc. to each user individually. Thus, conventional systems engender a sense of isolation in passengers utilizing a conventional transportation service.

Furthermore, conventional virtual reality systems frequently rely on a known story or a predefined route (e.g., an established roller coaster track) to provide a virtual reality experience to a user. For instance, conventional virtual reality systems generate an immersive virtual environment for presentation to a user based on an unchanging predesigned series of events. Therefore, these conventional virtual reality system suffer from disadvantages in adaptability and variability.

Thus, there are several disadvantages with regard to conventional transportation systems.

SUMMARY

One or more embodiments described herein provide benefits and solve one or more of the foregoing or other problems in the art with systems and methods for providing a virtual reality transportation experience. In particular, the systems and methods described herein generate three-dimensional virtual objects within three-dimensional virtual surroundings to display to a passenger by way of a virtual reality device. To illustrate, the systems and methods described herein gather sensory information regarding various travel routes to build a historical sensory information database. That is to say, the systems and methods collect and compile sensory data related to inertial forces associated with each route navigated by each transportation vehicle of the system. Based on the historical sensory data, the systems and methods described herein predict inertial forces that a passenger will experience during a travel route. The systems and methods generate a virtual reality experience including virtual interactions to coincide with the predicted inertial forces so that the interactions (e.g., events) within the virtual reality experience appear to the passenger to cause any actual inertial forces that occur throughout the travel route (e.g., as a result of starting, stopping, accelerating, decelerating, turning, etc.).

In addition, or alternatively, to providing a virtual reality experience relating to inertial forces throughout a travel route, the systems and methods described herein also provide a display of a sensory view of the surroundings of a transportation vehicle to a passenger. In other words, in the case of an autonomous transportation vehicle, the systems and methods take sensory readings (e.g., by way of a sensor suite of the transportation vehicle) to detect objects within the surroundings of the transportation vehicle and present a three-dimensional virtual display of the objects within a virtual rendering of the surroundings. Thus, the systems and methods generate and provide a virtual sensory representation to the passenger.

The systems and methods described herein also enable a passenger to share a view of the virtual reality experience with others. For example, the systems and methods provide the three-dimensional virtual reality experience with other passengers currently riding in the same transportation vehicle, with passengers of other transportation vehicles, with passengers waiting for pickup, and/or even with other individuals who are not passengers.

By providing a three-dimensional virtual reality experience, the systems and methods described herein provide a more engaging and immersive experience than conventional systems. Additionally, by providing these virtual objects for presentation within an immersive three-dimensional virtual reality environment, the systems and methods also create a greater sense of user engagement. Furthermore, by providing the option to share a virtual experience with others, the systems and methods described herein are more inclusive and inviting than conventional systems.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
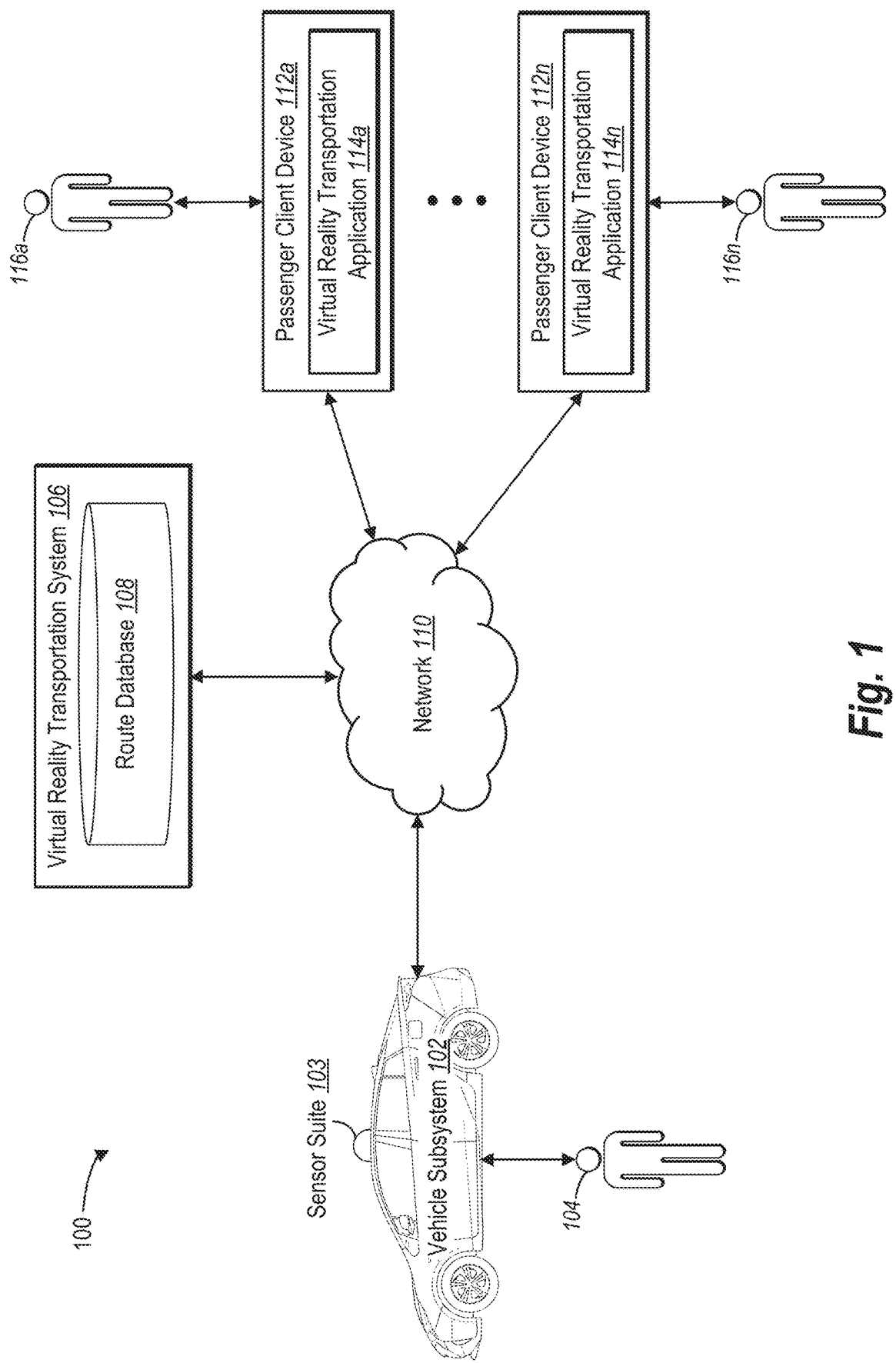
FIG. 1 illustrates a schematic diagram of an example environment of a virtual reality transportation system in accordance with one or more embodiments.

One or more embodiments described herein provide benefits and solve one or more of the foregoing or other problems in the art with a virtual reality transportation system. For example, the virtual reality transportation system generates and provides a three-dimensional virtual reality experience for (e.g., by way of a virtual reality device) to a passenger. In particular, the virtual reality experience includes virtual interactions (e.g., virtual experiences or virtual actions) that correspond to inertial forces that the virtual reality transportation system predicts a passenger will experience while riding in a transportation vehicle. The virtual interactions give the passenger the impression that the virtual interactions cause whatever actual inertial forces the passenger really does experience while riding in the transportation vehicle.

To generate the virtual reality transportation experience, the virtual reality transportation system accesses historical sensory data for a travel route. The historical sensory data describes inertial forces and other motion-related information for the travel route—i.e., the historical sensory data includes information indicating when and where and with what intensity a sensor suite on a transportation vehicle experiences inertial forces along the route. The virtual reality transportation system stores the historical sensory data for each route that each vehicle associated with the virtual reality transportation system travels. Accordingly, the virtual reality transportation system builds a historical sensory database across the entire system.

To store the historical sensory data, the virtual reality transportation system collects and accumulates the historical information over each route traveled by a transportation vehicle. To illustrate, the virtual reality transportation system may have a number of transportation vehicles (e.g., cars, buses, ferries, etc.) all over the world that pick up and transport passengers, delivering them to various destinations across the globe. For each route that each transportation vehicle travels, the virtual reality transportation system gathers information by way of a sensor suite on, connected to, or otherwise integrated with the transportation vehicle.

For example, the sensor suite of each transportation vehicle records inertial forces (e.g., gravitational-forces or "g-forces") and other motion-related information such as direction, speed, acceleration, etc., as the transportation vehicle travels. The virtual reality transportation system logs the data that each sensor suite gathers and records the data relative to the location of the transportation vehicle at the time the sensor suite gathers the data. This way, the virtual reality transportation system correlates certain inertial forces, speeds, directions, etc., with specific turns in the road or specific stop signs, yield signs and/or current traffic at a particular time of day in a given location. Indeed, the virtual reality transportation system also maintains a record of the location of each transportation vehicle by way of a global positioning system ("GPS") and/or a GPS device of the transportation vehicle (e.g., as part of the sensor suite).

Beyond collecting historical sensory data, the virtual reality transportation system predicts inertial forces that a transportation vehicle—and any passengers within the transportation vehicle—will experience along a particular travel route. To predict inertial forces, the virtual reality transportation system first receives a request for pickup from a passenger. The virtual reality transportation system matches the passenger based on the location of the passenger with a driver and assigns the driver to pick up the passenger and transport the passenger to a desired destination. For instance, a passenger utilizes a mobile application to request a ride and to further indicate a desired destination, whereupon the virtual reality transportation system matches the driver to the passenger and informs both parties (e.g., by way of respective mobile devices) that the driver will pick up and transport the passenger.

Upon receiving the request for pickup along with the indication of the desired destination, the virtual reality transportation system identifies a location of the passenger (e.g., by way of a GPS locator device of the passenger's mobile device) and determines a travel route to transport the passenger to the desired destination. To illustrate, the virtual reality transportation system analyzes current traffic information for the roads in the area around the passenger's location as well as in the area around the desired destination to determine an optimal or ideal travel route (e.g., based on which route is fastest, shortest, fewest turns, has the fewest turns, or some other factor). Additionally, the virtual reality transportation system analyzes historical information related to past traffic patterns as well as to previous travel routes that previous transportation vehicles have used to transport previous passengers throughout the area to determine which travel routes are historically faster, shorter, require fewer turns, etc.

After determining the travel route that the driver will navigate to transport the passenger to the desired destination, the virtual reality transportation system identifies maneuvers (e.g., turns, stops, merges, accelerations, decelerations, etc.) along the travel route. For each maneuver along the travel route, the virtual reality transportation system predicts an inertial force that the transportation vehicle and the passenger will experience. For instance, the virtual reality transportation system accesses the historical information for each maneuver along the route and identifies previous inertial forces that transportation vehicles have experienced in the past for the same turns, merges, stops, etc. In some cases, the virtual reality transportation system determines (e.g., calculates) an average of each of the previous inertial forces for the maneuvers along the travel route to predict the inertial forces that the passenger will experience. Additional detail regarding the previous inertial forces is provided below with reference to the figures.

Based on the predicted inertial forces, the virtual reality transportation system generates a virtual reality experience for the passenger. In other words, the virtual reality transportation system generates a three-dimensional immersive virtual reality environment including virtual objects and virtual interactions for presentation to the passenger (e.g., by way of a virtual reality device). The virtual reality transportation system generates virtual interactions to correspond to the predicted inertial forces that the passenger will experience along the travel route. To elaborate, the virtual reality transportation system generates a virtual reality experience to include virtual interactions at one or more of the places or times where maneuvers are located along the route so that the virtual interactions, which may include, but are not necessarily limited to, virtual collisions with objects, virtual turns, virtual drops, etc., give the passenger the impression that that the virtual interactions cause the inertial forces corresponding to the maneuvers.

As an example, the virtual reality transportation system generates a three-dimensional virtual reality transportation experience that includes an immersive environment such as a river rafting scene with a rushing, tree-lined river, mountains in the background, and a boat that represents the transportation vehicle. As the transportation vehicle begins navigating the travel route to transport the passenger to the destination, the virtual reality transportation system provides the virtual reality environment to a virtual reality device that the passenger is wearing or otherwise watching. Thus, the passenger sees the surrounding trees and mountains, and as the transportation vehicle begins to move, so does the virtual reality experience. For instance, the boat that the passenger appears to be sitting in begins floating down the river and gives the passenger the impression that the speed of the virtual river is commensurate with the actual, real-world speed of the transportation vehicle.

Continuing the example, the virtual reality transportation system presents the virtual reality experience with virtual interactions placed at various timing and/or distance intervals to match the time and/or distance it takes for the transportation vehicle to encounter the corresponding maneuvers in the real world. Thus, when the transportation vehicle performs a maneuver, such as an acceleration, for example, the passenger sees a section of rapids in the river and feels as though the boat speeds up as it floats through the rapids downstream, giving the passenger the impression that the virtual interaction (e.g., crossing the rapids) causes the sensation of being slightly pinned back in the seat that was actually due to the acceleration of the transportation vehicle. Additional detail regarding various other virtual interactions and detail regarding other features of the appearance and functionality of the virtual reality transportation experience is provided below with reference to the figures.

In some embodiments, the virtual reality transportation system generates a three-dimensional virtual reality transportation experience that includes a display of other transportation vehicles. In other words, the virtual reality transportation system generates a three-dimensional environment to include three-dimensional objects that represent other transportation vehicles within (e.g., associated with) the virtual reality transportation system. For example, the virtual reality transportation system presents, within a virtual reality transportation experience, a view of one or more other transportation vehicles as though they are a part of the virtual reality experience.

To illustrate an example, the virtual reality transportation system generates a virtual reality transportation experience that includes a scene of outer space where the transportation vehicles appear as UFOs or flying saucers. As the passenger perceives the virtual reality experience by way of a virtual reality device, the passenger sees one or more other flying saucers that each represent another transportation vehicle associated with the virtual reality transportation system.

In some cases, the virtual reality transportation system determines a location of each of the transportation vehicles and, based on the locations of each transportation vehicle, determines (e.g., calculates) a distance between the passenger's transportation vehicle and each of the other transportation vehicles. Based on the determined distance, the virtual reality transportation system presents the flying saucers—or other representative objects—corresponding to each of the other transportation vehicles as either smaller or larger within the view of the virtual reality environment of outer space, depending on whether the transportation vehicles are farther away or closer to the passenger's transportation vehicle, respectively.

As part of the virtual reality experience in these embodiments, the virtual reality transportation system enables passengers within each of the transportation vehicles to interact. For example, the virtual reality transportation system generates a virtual game of tag where each flying saucer can fire a laser at other flying saucers in, for example, the direction that the passenger aims. The virtual reality transportation system may also notify each passenger within the respective transportation vehicles when their transportation vehicle (e.g., flying saucer) has been hit and/or when they have scored a hit on someone else. Additional detail regarding providing a view of other passengers and/or transportation vehicles within the virtual reality experience is provided below with reference to the figures.

In these or other embodiments, the virtual reality transportation system generates and provides a virtual sensory view to the passenger. To illustrate, the virtual reality transportation system analyzes the surroundings of the transportation vehicle by way of the transportation vehicle's sensor suite. The sensor suite may include, but is not limited to, a light detection and ranging ("LIDAR") sensor, an accelerometer, a gyroscope, and/or a magnetometer. The accelerometer, gyroscope, and magnetometer may be housed together in an electronic device called an inertial measurement unit ("IMU") to measure specific force, angular rate, and/or magnetic field.

In any case, a vehicle associated with the virtual reality transportation system detects objects (e.g., buildings, roads, sidewalks, people, etc.) within the surroundings of the transportation vehicle by using the sensor suite. Based on the sensory readings of the sensor suite in analyzing the surroundings of the transportation vehicle, the virtual reality transportation system generates a three-dimensional virtual representation of the sensory readings that depicts the surrounding area from a view as the transportation vehicle would "see" the world. In some embodiments, however, the transportation vehicle associated with the virtual reality transportation system generates the three-dimensional virtual representation of the sensory readings. In these or other embodiments, the transportation vehicle may further provide the three-dimensional virtual representation of the sensory readings to the passenger (e.g., by way of a passenger client device and/or a device within the transportation vehicle itself). In any case, the virtual reality transportation system and/or the transportation vehicle provide the virtual sensory view to the passenger by way of a virtual reality device, as mentioned above. Additional detail regarding the virtual sensory view is provided below with specific reference to FIG. 7.

An additional feature of the virtual reality transportation system is the ability to share a virtual reality experience with others. That is to say, the virtual reality transportation system enables a passenger to share (e.g., transmit, transfer, etc.) a three-dimensional virtual reality presentation (e.g., the river scene or the sensory view described above) with another passenger or with another individual who is not a passenger. In some cases, the virtual reality transportation system enables the passenger to share a view, as the passenger observes through a virtual reality device, with another passenger of the same transportation vehicle or with a passenger of another transportation vehicle associated with the virtual reality transportation system.

Accordingly, by enabling passengers to share a presentation of a virtual reality experience with others, the virtual reality transportation creates a greater sense of inclusion within the transportation experience. In particular, the virtual reality transportation system helps a second passenger enjoy the same experience as the first passenger so that the virtual reality transportation experience can be more communal in nature. Thus, the virtual reality transportation system helps passengers feel more connected than in conventional systems.

By generating and providing a virtual reality transportation experience, the virtual reality transportation system described herein is more immersive than conventional transportation systems. For example, the virtual reality transportation system provides a virtual experience throughout the duration of a travel route as a passenger rides in a transportation vehicle. The passenger feels as though the virtual experience causes the motions that the passenger feels throughout the ride. In some cases, the virtual reality transportation system provides a virtual reality experience that is more thrilling or scary, while in other cases the virtual reality transportation system provides a virtual reality experience that is more light-hearted and fun (e.g., in response to a setting selection by the passenger). In any case, the virtual reality transportation system is more immersive and engaging than conventional transportation systems.

In addition, the virtual reality transportation system described herein is more variable and adaptive than other conventional virtual reality systems. In particular, by generating virtual interactions and three-dimensional virtual objects based on real-world sensory information (e.g., sensory readings taken by one or more transportation vehicles), the virtual reality transportation system generates a virtual reality experience that is variable depending on locations and/or timing of predicted inertial forces and/or identified real-world objects along a travel route. Therefore, the virtual reality transportation system is less restricted than conventional systems.

More detail regarding the virtual reality transportation system will now be provided with reference to the figures. In particular, FIG. 1 illustrates a schematic diagram of an example virtual reality transportation environment 100 for implementing a virtual reality transportation system in accordance with one or more embodiments. An overview of the virtual reality transportation system 106 and the environment 100 is described in relation to FIG. 1. Thereafter, a more detailed description of the components and processes of the virtual reality transportation system 106 is provided in relation to the subsequent figures.

As shown in FIG. 1, the virtual reality transportation environment 100 includes a vehicle subsystem 102. The vehicle subsystem 102 includes a sensor suite 103 and is associated with a driver 104. In some embodiments, the vehicle subsystem 102 represents an autonomous transportation vehicle.

As used herein, a "vehicle subsystem" refers to a number of components within a vehicle system that operates within the virtual reality transportation environment 100. For example, a vehicle subsystem can include, as mentioned above, a sensor suite 103. The sensor suite can include, but is not limited to a LIDAR sensor, an IMU (e.g., including an accelerometer, a gyroscope, and/or a magnetometer) or a wireless IMU ("WIMU"), a GPS device, one or cameras, and/or one or more microphones. A vehicle subsystem may also refer to an autonomous vehicle that is self-operational—i.e., the autonomous transportation vehicle requires no human operator to navigate a travel route to transport a passenger, but instead navigates by way of computer operation based on sensory readings taken by the sensor suite 103.

The environment 100 also includes a driver 104 associated with the vehicle subsystem 102, as mentioned above. The term "driver" as used herein refers to an individual person who operates the transportation vehicle of the vehicle subsystem 102. Alternatively, as mentioned above, the virtual reality transportation environment 100 may not include a driver 104, but instead the vehicle subsystem 102 may be an autonomous vehicle system—i.e., a self-driving transportation vehicle that includes computer components and accompanying sensors requisite for driving without manual driver input from a human operator (or with minimal manual driver input from a human operator).

In addition to the vehicle subsystem 102, the virtual reality transportation environment 100 also includes the virtual reality transportation system 106, a network 110, and one or more passenger client devices 112a-112n (referred to herein collectively as "passenger client devices 112"), each associated with passengers 116a-116n (referred to herein collectively as "passengers 116"). As used herein, a passenger (e.g., passenger 116a) refers to an individual or group of individuals who has requested a ride from the virtual reality transportation system 106 and/or who rides in the transportation vehicle of the vehicle subsystem 102. A passenger may refer to an individual who has requested a ride but who is still waiting for pickup. A passenger may additionally or alternatively refer to an individual who has already been picked up and who is currently riding within the vehicle subsystem 102 on the way to a desired destination (e.g., a destination indicated by the passenger 116a).

Additionally, a passenger client device (e.g., passenger client device 112a) may refer to a mobile device such as, for example, a smartphone or tablet associated with a passenger (e.g., passenger 116a). For example, the passenger 116a may interact with the passenger client device 112a by way of the virtual reality transportation application 114a installed thereon to request a transportation ride from the virtual reality transportation system 106. The passenger 116a may further provide input by way of the virtual reality transportation application 114a on the passenger client device 112a to select a particular location (e.g., a place on a nearby sidewalk) for pickup, to indicate a desired destination, and/or to indicate a particular location for drop-off at or near the destination.

A passenger client device may also (or alternatively) refer to a virtual reality device associated with a passenger (e.g., passenger 116a). For example, the passenger client device 112a may include a wearable virtual reality device such as OCULUS RIFT, SAMSUNG GEAR VR, HTC VIVE, or other virtual reality device that the passenger 116a can wear. As another example, the passenger client device 112a may include a virtual reality device that is built in to the vehicle subsystem 102 such as a windshield and/or one or more windows that display a virtual reality environment to the passenger 104. In particular, the passenger client device 112a may be capable of rendering and displaying a three-dimensional virtual reality environment including virtual objects/elements.

As used herein, the virtual reality transportation application (e.g., virtual reality transportation application 114a) refers to an application in the form of hardware, software, or both installed on the passenger client devices 112 and/or installed as part of the vehicle subsystem 102. In addition, a virtual reality transportation application can include one or more user options that enable a passenger 116a to interact (e.g., select, tap, touch, click, etc.) to provide input information to request a transportation ride, accept a request for a ride, and perform other necessary tasks to organize a ride between a passenger 116a and a vehicle subsystem 102.

Furthermore, in some embodiments, the virtual reality transportation application can also include functionality related to virtual reality. In particular, the virtual reality transportation application 114a installed on the passenger client device 112a may be able to communicate with the virtual reality transportation system 106 to receive information related a virtual reality environment, and may be able to render the virtual reality environment for display to the passenger 116a. For example, the passenger client device 112a, by way of the virtual reality transportation application 114a, may render and display a virtual reality environment of a river scene or a sensory view of the surroundings of the vehicle subsystem 102, as described above.

As shown by the virtual reality transportation environment 100 of FIG. 1, the virtual reality transportation system 106 communicates with the vehicle subsystem 102 and/or the passenger client devices 112 by way of the network 110. For example, the network 110 facilitates transmission of data packets to relay information between the virtual reality transportation system 106, the vehicle subsystem 102, and/or the passenger client devices 112. To illustrate, the virtual reality transportation system 106 may access GPS location information or other information from the vehicle subsystem 102 and/or one or more of the passenger client devices 112. In some embodiments, the virtual reality transportation system 106 may access other geo-location information such as satellite triangulation information, ground-based radio-navigation information, etc.

In addition, the vehicle subsystem 102 and/or the passenger client devices 112 communicate with the virtual reality transportation system 106 to provide GPS coordinates, traffic information, pickup request information, travel route information, etc. to the virtual reality transportation system 106. For example, the passenger client device 112a transmits a GPS coordinate of the passenger 116a upon detecting that the passenger 116a requests a pickup from the virtual reality transportation system 106. In addition, when the passenger 116a indicates a desired pickup location, a desired destination, and/or a desired drop-off location, the passenger client device 112a also transmits the corresponding information to the virtual reality transportation system 106 via an appropriate communication protocol.

As used herein, a desired destination refers to an end destination for a travel route that a passenger requests or takes in a transportation vehicle (e.g., the transportation vehicle of the vehicle subsystem 102). That is to say, a desired destination refers to a place or locale to which the passenger desires to be transported within the transportation vehicle. In particular, a desired destination can include, but is not limited to, a restaurant, a place of business, a park, a street address, a tourist attraction, or a landmark.

As illustrated in FIG. 1, the virtual reality transportation system 106 communicates with the vehicle subsystem 102 and the passenger client devices 112 to build a database of historical information. In particular, the virtual reality transportation system 106 stores the historical information gathered from the vehicle subsystem 102 and the passenger client devices 112 within route database 108. For instance, the virtual reality transportation system 106 stores historical sensory data collected by the sensor suite 103 of the vehicle subsystem 102 as well as by other vehicle subsystems associated with the virtual reality transportation system 106.

To illustrate, the virtual reality transportation system 106 maintains constant records of each ride associated with the vehicle subsystem 102 (and all other vehicle subsystems associated therewith). In particular, the virtual reality transportation system 106 maintains historical sensory data within the route database 108 by compartmentalizing various data as associated with a particular passenger (e.g., passenger 116a), with a particular vehicle subsystem (e.g., vehicle subsystem 102), and/or with a particular travel route. To illustrate, the virtual reality transportation system 106 records each passenger location, driver location, pickup route, drop-off route, the time of day and duration for navigating each route for the driver 104 as well as the passenger 116a, and other information associated with each ride request that the virtual reality transportation system 106 receives from a passenger. The virtual reality transportation system 106 keeps records of each route associated with each transportation vehicle within each vehicle subsystem associated with the virtual reality transportation system 106. Accordingly, the virtual reality transportation system 106 maintains historical information across all vehicle subsystems and all passengers (e.g., passengers 116) associated with the virtual reality transportation system 106 within the route database 108.

Furthermore, the virtual reality transportation system 106 maintains historical sensory information for each travel route navigated by a transportation vehicle associated with the virtual reality transportation system 106. To illustrate, as a transportation vehicle (e.g., transportation vehicle 102) navigates a travel route, the sensor suite 103 gathers sensory data related to inertial forces (e.g., G-forces, specific force, angular rate, etc.) throughout the duration of the travel route. The virtual reality transportation system 106 organizes the sensory data for each route according to one or more of a location (e.g., a GPS location) associated with each inertial force, a maneuver associated with each inertial force, and/or a time (e.g., a time of day or a time interval since the start of the travel route) associated with each inertial force.

As used herein, a travel route refers to a route or path that a transportation vehicle can navigate to transport a passenger to a destination. Particularly, a travel route can include a series of maneuvers including, but not necessarily limited to, continuing straight for a certain specified distance, turning right or left, merging, stopping, yielding, crossing the street, etc. In addition, the virtual reality transportation system 106 can analyze historical sensory data for the travel route along each maneuver to building an inertial map of the travel route.

As mentioned, FIG. 1 illustrates a virtual reality transportation environment 100 wherein the virtual reality transportation system 106 communicates with passenger client device 112 and the vehicle subsystem 102 to organize and facilitate rides for passengers 116. For example, in some cases, the virtual reality transportation system organizes a ride share where more than one passenger (e.g., passenger 116*a* and passenger 116*b*) each request pickup from the virtual reality transportation system in a similar time frame and/or similar location as one another or along a similar navigation route. The virtual reality transportation system may determine a vehicle subsystem 102 relevant to both passengers. The virtual reality transportation system 106 then schedules pickup for the passenger 116*a* and the passenger 116*b*, one after the other, to send the transportation vehicle of the vehicle subsystem 102 to pick each passenger up in turn, and further to drop each passenger off in turn at or near desired destinations indicated by each passenger 116*a* and 116*b*.

Furthermore, the virtual reality transportation system 106 communicates (e.g., by way of network 110) with the vehicle subsystem 102 and the passenger client devices 112 to provide a virtual reality experience. To illustrate, the virtual reality transportation system 106 generates and provides a three-dimensional virtual environment composed of computer-generated objects and textures to enable the passenger client device 112*a* to render the three-dimensional virtual reality environment for display to the passenger 116*a*. In some embodiments, the virtual reality transportation system 106 provides timing and/or location information to the passenger client device 112*a* so that the passenger client device 112*a* can generate and provide a virtual reality environment for display to the passenger 116*a*.

In addition, the virtual reality transportation system 106 generates virtual interactions as part of the virtual reality experience so that, when the passenger client device 112*a* displays the virtual reality environment to the passenger 116*a*, the passenger 116*a* experiences virtual inertial forces that correspond to actual inertial forces that the passenger 116*a* experiences while riding in the transportation vehicle.

As used herein, a virtual interaction (e.g., a virtual inertial interaction) refers to an action or event that occurs within a virtual reality experience (e.g., movement of a virtual object within a virtual reality environment, collision with a virtual object within a virtual reality environment, etc.) to create a virtual inertial force. The virtual inertial force corresponds to an actual inertial force that the passenger 116*a* experiences in real life while riding in the transportation vehicle. Generally, a virtual inertial interaction occurs within a virtual reality experience at a specific time along a travel route and/or at a particular location. For instance, the virtual reality transportation system 106 predicts GPS locations or timing along a particular travel route where the passenger 116*a* will experience inertial forces (e.g., based on the historical sensory data) and generates virtual interactions for those locations and/or times as part of the virtual reality experience.

Additionally, a virtual interaction can refer to a virtual sensory interaction such as a virtual olfactory (e.g., smell) interaction, a virtual somatosensory (e.g., touch) interaction, or a virtual auditory (e.g., hearing) interaction. To illustrate, the virtual reality transportation system 106 can communicate with the vehicle subsystem 102 by way of network 110 to integrate features of the vehicle subsystem 102 as part of the virtual reality transportation experience. For instance, the vehicle subsystem 102 can include water misters, scent distributors, speakers, etc. The virtual reality transportation system 106 can indicate to the vehicle subsystem 102 to distribute a pine scent within the transportation vehicle at a location where the virtual reality transportation system 106 identifies a forest of pine trees along a travel route. Additionally or alternatively, the virtual reality transportation system 106 may indicate to the vehicle subsystem 102 to spray a water mister at a location where the virtual reality transportation system 106 identifies a nearby river or ocean along a travel route. Accordingly, the virtual reality transportation system 106 can incorporate the vehicle subsystem 102 as well as the passenger client devices 112 to generate and provide the virtual reality transportation experience. Additional detail regarding generating and providing virtual reality experience, including the virtual environment, objects, interactions, etc. is provided below with reference to FIGS. 2-7.

As used herein, a virtual reality experience refers to a three-dimensional, immersive, computer-generated virtual reality environment that includes virtual interactions to presentation to the passenger 116*a*. Generally, a virtual reality experience refers to a presentation of the virtual reality environment for the duration of a travel route as the passenger 116*a* rides within the transportation vehicle to a desired destination.

As illustrated in FIG. 1, the virtual reality transportation system 106, the vehicle subsystem 102, and the passenger client devices 112 may directly communicate with each other, bypassing network 110. For example, the virtual reality transportation system 106 may communicate directly with the vehicle subsystem 102, or indirectly via network 110, to receive location information and other driver-related information as mentioned above and described in further detail below. Furthermore, the virtual reality transportation system 106 may communicate directly with passenger client devices 112, or indirectly via network 110, to receive passenger location information, route destination information, or other passenger related information, as mentioned above and described in further detail below.

Although FIG. 1 illustrates the virtual reality transportation system 106 as separate and distinct from the passenger client devices 112 and the vehicle subsystem 102, in some embodiments, the virtual reality transportation system 106 may include one or more of the passenger client devices 112 and may additionally or alternatively include all or part of the vehicle subsystem 102.

As will be described in further detail below with reference to FIGS. 2-7, the components of the virtual reality transportation environment 100 or the virtual reality transportation system 106 can collect historical sensory data and provide a virtual reality experience to a passenger during navigation of a travel route.

Although much of the discussion provided herein is primarily directed to creating and providing a virtual reality experience, it will be understood based on this disclosure that the virtual reality transportation system 106 accesses previously-created historical data related to various routes navigated by passengers and drivers alike. In particular, in these or other embodiments, the virtual reality transportation system 106 collects (e.g., gathers) historical sensory data related to previous routes traveled by the vehicle subsystem 102 or other vehicle subsystem associated with the virtual reality transportation system 106.

Figure 2:
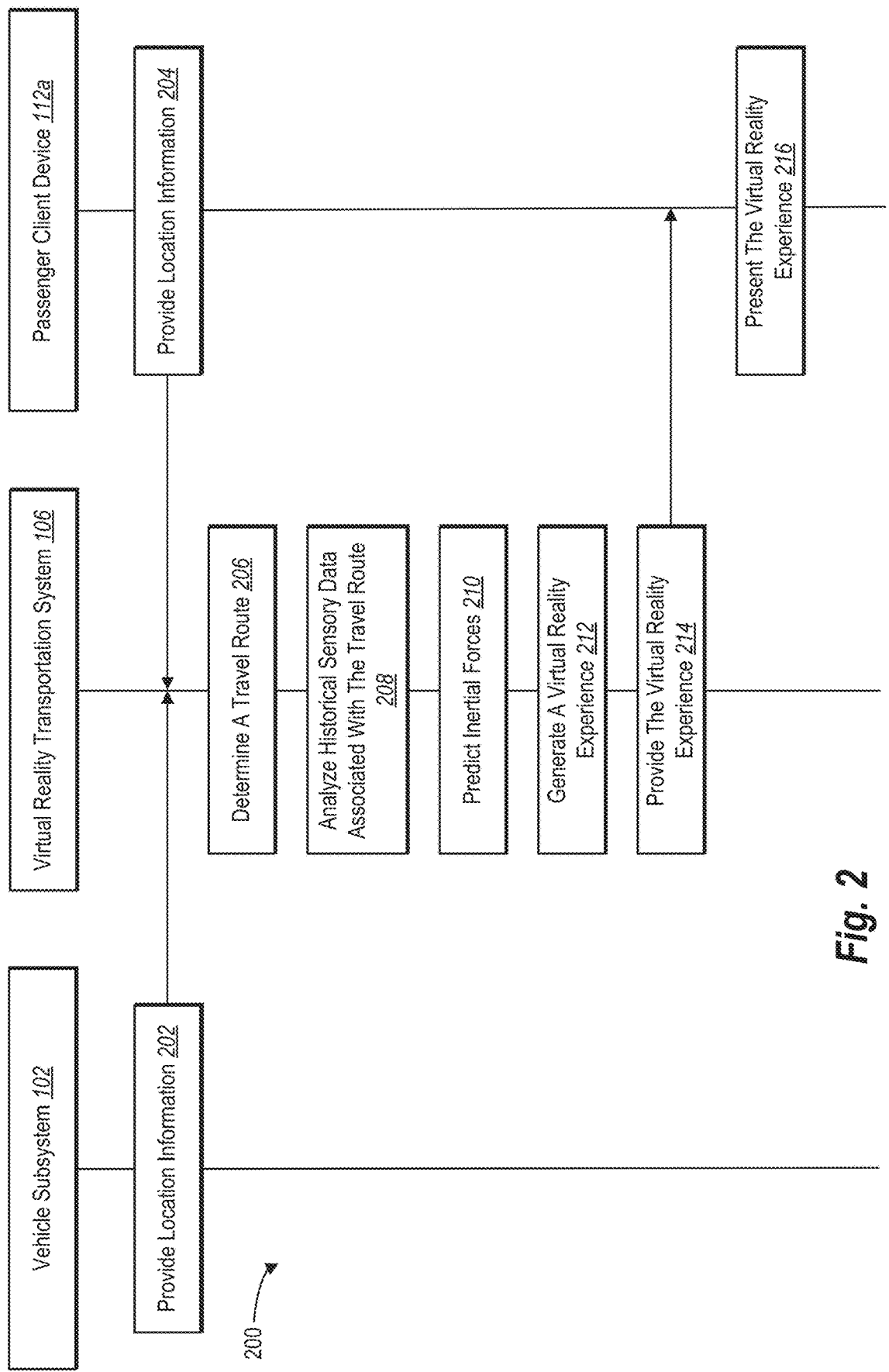
FIG. 2 illustrates a sequence diagram for presenting a virtual reality experience in accordance with one or more embodiments.

FIG. 2 illustrates a sequence 200 of a series of acts performed by the vehicle subsystem 102, the virtual reality transportation system 106, and/or the passenger client device 112a. While FIG. 2 illustrates a single passenger client device 112a, it will be understood from this disclosure that additional or alternative passenger client devices 112 may also perform the acts described in relation to FIG. 2. Furthermore, while FIG. 2 illustrates a particular order or sequence for the acts depicted therein, the acts may be performed in an alternative order and may further include additional or alternative acts as well.

As illustrated by sequence 200 of FIG. 2, the vehicle subsystem provides location information to the virtual reality transportation system 106, as depicted by act 202. Initially, the virtual reality transportation system 106 receives a request for a transportation ride from a passenger 116a by way of passenger client device 112a. To organize the transportation ride, the virtual reality transportation system 106 identifies and assigns the vehicle subsystem 102 as a match to pick up and transport the passenger 116a. Upon the virtual reality transportation system 106 assigning the vehicle subsystem 102 to pick up the passenger 116a, the vehicle subsystem 102 communicates with the virtual reality transportation system 106 by way of network 110 to provide a GPS coordinate location of the vehicle subsystem 102. Additionally or alternatively, the vehicle subsystem communicates with the virtual reality transportation system 106 to provide a GPS coordinate or other location information independent of whether the virtual reality transportation system 106 assigns the vehicle subsystem 102 to pick up the passenger 116a. In some examples, the vehicle subsystem 102 provides a street address, latitude and longitude coordinates, a geographic hash or other predefined location identifier, and/or any other form of location information to the virtual reality transportation system 106.

To provide the location information of act 202 to the virtual reality transportation system 106, in some embodiments, the vehicle subsystem 102 relays a GPS coordinate by way of a GPS locator device within the vehicle subsystem 102 (e.g., as part of the sensor suite 103). In these embodiments, the vehicle subsystem 102 continuously provides a latitude and longitude of the location of the transportation vehicle of the vehicle subsystem 102 so that the virtual reality transportation system 106 can constantly monitor the changing location of the transportation vehicle. For example, when the vehicle subsystem 102 is moving (e.g., as the driver 104 drives the transportation vehicle or else as the transportation vehicle drives itself in the case of an autonomous transportation vehicle), the virtual reality system 106 receives periodic updates (e.g., every half second, every second, etc.) of the GPS location of the vehicle subsystem 102 to monitor and track changes in location.

In addition to location information, the vehicle subsystem 102 may further provide information relating to speed, direction of travel, total distance traveled, total time spent traveling, and other information relating to the vehicle subsystem 102. In particular, the vehicle subsystem 102 may collect these sensory data as well as sensory data relating to inertial forces by way of the sensor suite 103, as described above. For example, the sensor suite 103 includes an accelerometer by which to determine a speed and direction of the vehicle subsystem 102. In other examples, the sensor suite 103 includes an IMU by which an on-board computing device can determine the specific force of the vehicle subsystem 102 at any point along a travel route. In any case, in these or other embodiments, the vehicle subsystem 102 provides information such as inertial force data, speed, direction, distance traveled, and travel time to the virtual reality transportation system 106.

As also illustrated in FIG. 2, the passenger client device 112a provides location information to the virtual reality transportation system 106, as illustrated by act 204. Similar to how the vehicle subsystem 102 provides location information to the virtual reality transportation system 106, the passenger client device 112a also includes a GPS locator device, an accelerometer, a gyroscope, a magnetometer, and/or other sensory devices by which the passenger client device 112a determines a location (e.g., GPS coordinates), speed of travel, direction of travel, etc., of the passenger 116a. In turn, the passenger client device 112a relays the location information and other sensory information to the virtual reality transportation system 106 (e.g., by way of network 110), as depicted by act 204 of FIG. 2.

In response to receiving the location information (and any additional sensory information) from the vehicle subsystem 102 and/or the passenger client device 112a, the virtual reality transportation system 106 determines a travel route to transport the passenger 116a to a particular destination (e.g., indicated by the passenger 116a by way of the passenger client device 112a), as shown by act 206 of FIG. 2. In particular, the virtual reality transportation system 106 identifies the location of the passenger 116a and analyzes historical information relating to past travel routes (e.g., stored within route database 108) as well as current information relating to traffic to determine an ideal route to navigate to the passenger's desired destination.

Continuing with sequence 200 of FIG. 2, the virtual reality transportation system 106 further analyzes historical sensory data associated with the determined travel route, as illustrated by act 208. In particular, the virtual reality transportation system 106 accesses historical sensory data stored in the route database 108—i.e., the historical sensory data relating to inertial forces and other motion-related information that the virtual reality transportation system 106 gathers from previous travel routes. In addition to analyzing historical sensory data associated with the travel route, in some embodiments, the virtual reality transportation system 106 analyzes historical sensory data associated with a driver profile, a type of vehicle, a time of day, etc. For instance, the virtual reality transportation system 106 may access historical sensory data stored for a particular driver. In any case, by analyzing the historical sensory data and other historical information (e.g., historical traffic information), the virtual reality transportation system 106 can predict inertial forces that the passenger 116a will experience while riding with the vehicle subsystem 102 along the determined travel route.

As mentioned, the virtual reality transportation system 106 predicts inertial forces, as illustrated by act 210 of FIG. 2. In particular, the virtual reality transportation system 106 identifies each maneuver along the travel route and, based on previous performances of vehicle subsystems in the past, predicts the speed at which the vehicle subsystem 102 will perform each maneuver along the route and also predicts the timing of each maneuver as well as the total time for navigating the travel route. The virtual reality transportation system 106 additionally predicts the inertial forces that the passenger 116a will experience throughout the travel route by assigning each predicted inertial force to a particular location (or timing) within the travel route. For instance, a given inertial force may correspond with a given maneuver such as a right-hand turn.

In more detail, the virtual reality transportation system 106 may predict inertial forces on a more micro scale. In other words, the virtual reality transportation system 106 may store, within route database 108, historical sensory data relating to potholes, speedbumps, or other road features (e.g., washboard bumps, gravel roads, lots of hills) of each travel route that a vehicle subsystem of the virtual reality transportation system 106 travels. By using this historical sensory data, the virtual reality transportation system 106 predicts more detailed inertial forces that the passenger 116a will experience along the travel route, including bumps and vibrations that are the result of road features such as potholes or speedbumps.

Sequence 200 of FIG. 2 further illustrates act 212, depicting that the virtual reality transportation system 106 generates a virtual reality experience. In particular, the virtual reality transportation system 106 generates a virtual reality experience based on the predicted inertial forces of the travel route. That is to say, for each predicted inertial force that the passenger 116a will experience while riding with the vehicle subsystem 102, the virtual reality transportation system 106 generates a virtual inertial interaction. In addition to the virtual inertial interactions, the virtual reality transportation system 106 further generates a virtual reality environment in which the virtual inertial interactions take place.

To illustrate, the virtual reality transportation system 106 generates or provides instructions to the passenger client device 112a to generate a three-dimensional virtual environment depicting a river rafting scene, a view of outer space, or other suitable virtual reality environment. The virtual reality transportation system 106 generates various virtual inertial interactions such as, for example, a collision with a spaceship or a sharp turn in the current of the river. Additionally, the virtual reality transportation system 106 coordinates the timing and/or placement of the virtual inertial interactions within the virtual reality experience so that the virtual inertial interactions coincide with predicted inertial forces that the passenger 116a experiences during the ride. Therefore, the passenger 116a perceives the collision of the spaceship or the turn of the river occur within the virtual reality environment, and has the impression that the collision or the turn cause, for example, a stopping or turning motion of the vehicle subsystem 102 that occurs in real life.

In some embodiments, the virtual reality transportation system 106 further communicates with the vehicle subsystem 102 to integrate the vehicle subsystem 102 as part of the virtual reality experience. As described above, the virtual reality transportation system 106 indicates to the vehicle subsystem 102 to spray a water mister in a situation where, for example, the river raft that the passenger 116a perceptibly rides in within the virtual reality environment hits a section of rapids. Additionally or alternatively, the virtual reality transportation system 106 communicates with the vehicle subsystem 102 and/or the passenger client device 112a to provide audio interactions as part of the virtual reality transportation experience. For instance, where the virtual reality transportation system 106 predicts a loud section of inner-city traffic, the virtual reality experience may include a scene of a loud marketplace on an alien planet to coincide. Accordingly, the virtual reality transportation system 106 may provide audio by way of the passenger client device 112a and/or the vehicle subsystem 102 (e.g., via speakers therein).

As further illustrated in FIG. 2, the sequence 200 includes an act 214 that shows that the virtual reality transportation system 106 provides the virtual reality experience to the passenger client device 112a. For instance, the virtual reality transportation system 106 communicates with the passenger client device 112a via network 110 to transmit the information necessary to present the virtual reality experience to the passenger 116a.

In some embodiments, the virtual reality transportation system 106 generates a template virtual reality experience and provides the template to the passenger client device 112a. To elaborate, the virtual reality transportation system 106 creates a virtual reality experience with various virtual inertial interactions independent of historical sensory data, timing, or other information. Then, based on the analyzed historical sensory data, the virtual reality transportation system 106 provides information to the passenger client device 112a to modify the template virtual reality experience so that the virtual inertial interactions occur at a time synchronous with the predicted inertial forces of the travel route. Additionally, the virtual reality transportation system 106 provides information to modify the template virtual reality experience to adjust for turns in the travel route, travel time for each maneuver along the route, etc.

In response to receiving the virtual reality experience from the virtual reality transportation system 106, the passenger client device 112a presents the virtual reality experience to the passenger 116a, as illustrated by act 216 of FIG. 2. In particular, the passenger client device 112a presents a display within a headset device or other device capable of rendering a three-dimensional representation of the virtual reality environment as part of the virtual reality experience. Thus, as the passenger 116a watches the virtual reality experience through the passenger client device 112a, the passenger 116a is immersed in a computer-generated three-dimensional environment and experiences the virtual inertial (and other sensory) interactions described above throughout the travel route.

Though not illustrated in FIG. 2, the virtual reality transportation system 106 may further provide an option (e.g., a user-selectable element within the virtual reality transportation application 114a) to the passenger 116a to share the virtual reality experience with others. To illustrate, the passenger client device 112a may present the virtual reality environment for display to the passenger 116a, along with a user interface as an overlay of the virtual reality environment (e.g., a heads-up display or HUD). The user interface may include an option to share a view of the virtual reality environment with another passenger (e.g., passenger 116b) by way of another passenger client device (e.g., passenger client device 112b). Passenger 116b may have the option to accept or decline to view a presentation of the virtual reality environment. Additionally, the user interface may include other options such as, for example, an option to start the virtual reality experience and an option to stop the virtual reality experience.

In some embodiments, though also not illustrated in FIG. 2, the virtual reality transportation system 106 provides the virtual reality experience to the vehicle subsystem 102. Additionally, in these embodiments the vehicle subsystem 102 displays the virtual reality experience to the passenger 116a (and any other passengers within the vehicle subsystem 102) by way of a virtual reality device associated with the vehicle subsystem 102 (e.g., windshield display, screens within the vehicle subsystem 102, etc.)

Figure 3A:
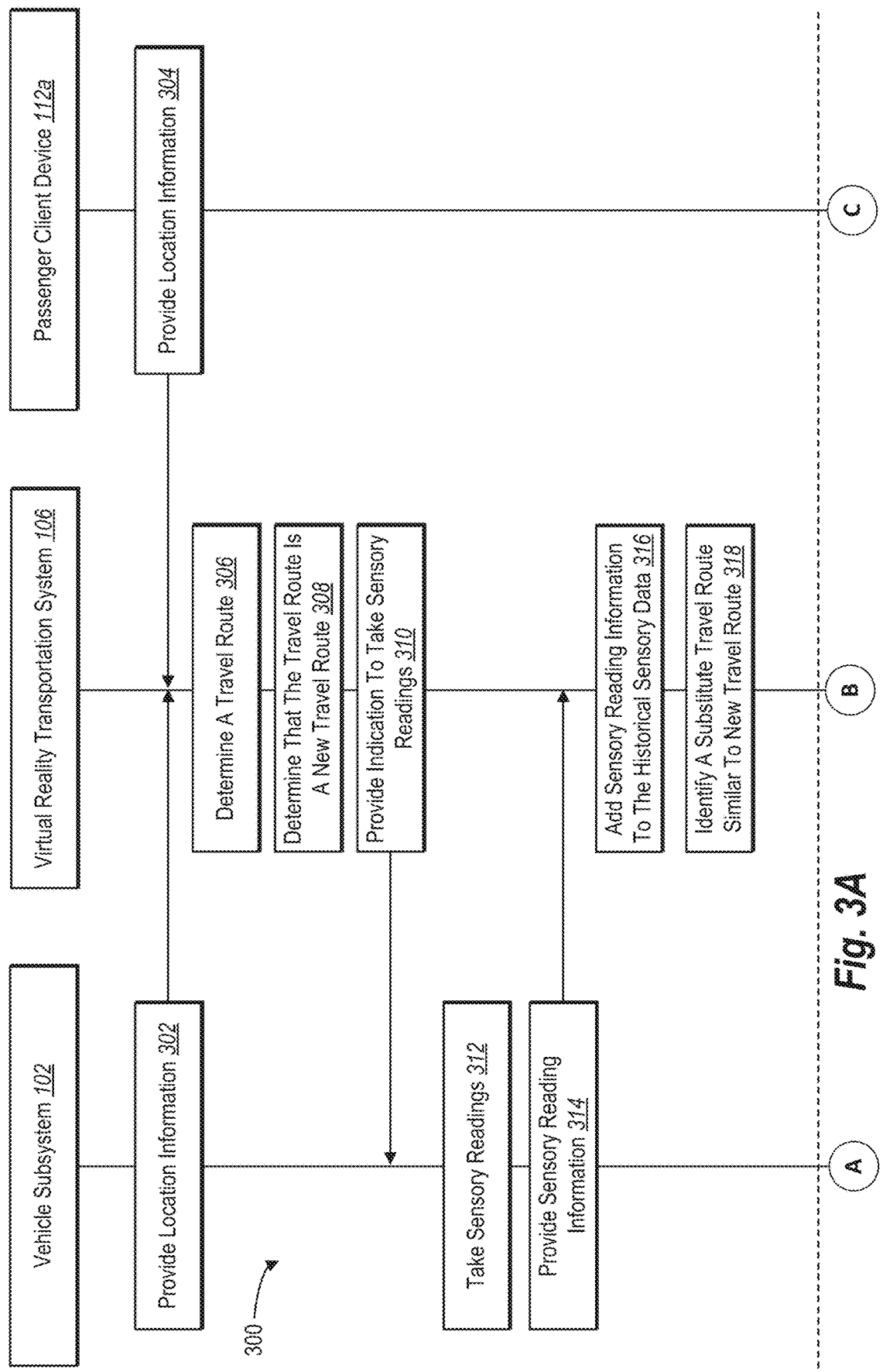
FIGS. 3A-3B illustrate another sequence diagram for presenting a virtual reality experience in accordance with one or more embodiments.
Figure 3B:
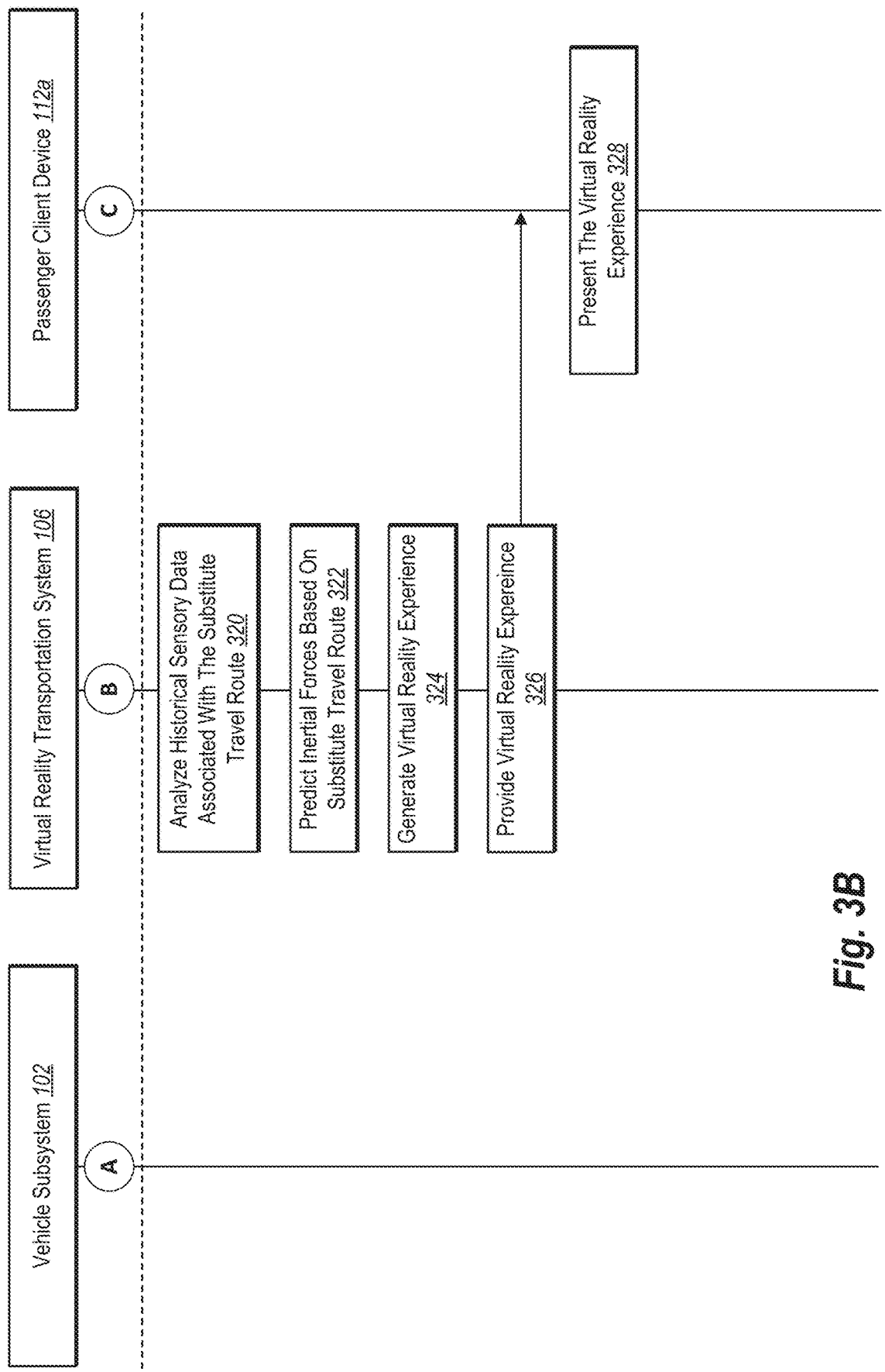

FIGS. 3A-3B illustrate a sequence 300 of acts performed by the vehicle subsystem 102, the virtual reality transportation system 106, and/or the passenger client device 112a. In particular, as illustrated by FIG. 3A, the vehicle subsystem 102 provides location information to the virtual reality transportation system 106, as depicted by act 302. As discussed above, the vehicle subsystem 102 determines a location by way of a GPS locator device within the sensor suite 103 or elsewhere, and provides the location information in the form of GPS coordinates, a street address, or other form to the virtual reality transportation system 106.

Additionally, the passenger client device 112a provides location information to the virtual reality transportation system 106, as depicted by act 304 of FIG. 3A. In particular, and as discussed above, the passenger client device 112a includes a GPS device by which the passenger client device 112a determines a location of the passenger 116a. The passenger client device 112a then transmits the GPS location information to the virtual reality transportation system 106.

As illustrated by FIG. 3A, the virtual reality transportation system 106 receives the location information from the vehicle subsystem 102 and the passenger client device 112a. In response to receiving the location information, the virtual reality transportation system 106 determines a travel route, as depicted by act 306 within sequence 300. Similar to the discussion of FIG. 2, the virtual reality transportation system 106 determines the travel route based on historical information relating to previous travel routes by vehicle subsystems in the past as well as historical traffic information for the particular area at the particular time of day, in addition to current traffic information as available.

Upon determining the travel route, the virtual reality transportation system 106 analyzes the travel route to determine whether the travel route is a new travel route—i.e., whether the virtual reality transportation system 106 has historical sensory data associated with the particular travel route from the past. If not, then the virtual reality transportation system 106 determines that the travel route is a new travel route, as illustrated in act 308. For instance, the virtual reality transportation system compares route information for the travel route such as, for example, the route path along every road within the route from the point where the vehicle subsystem 102 will meet the passenger 116a for pickup to the destination. If the virtual reality transportation system 106 analyzes the travel route and determines that no previous vehicle subsystem 102 has traveled the same route, then the virtual reality transportation system 106 identifies the travel route as a new travel route. Indeed, in some cases the virtual reality transportation system 106 determines that the travel route is composed of various sections of road along the path that have been previously traveled and logged within the route database 108, but that the entire route from start to finish is not the same as any single previous travel route.

Additionally or alternatively, the virtual reality transportation system 106 analyzes the travel route to determine whether sensory data is incomplete for the route (e.g., the travel route is not completely mapped). In these or other embodiments, the virtual reality transportation system 106 assigns a threshold number of sensory readings to the travel route such that, in response to determining that the historical sensory data does not contain at least the threshold number of sensory readings for the travel route, the virtual reality transportation system 106 determines that the travel route is a new travel route. In contrast, if the virtual reality transportation system 106 determines that the historical sensory data contains at least the threshold number of sensory readings, the virtual reality transportation system 106 determines that the route is not a new travel route.

Furthermore, in the same or other embodiments, the virtual reality transportation system 106 considers various factors in determining whether the travel route is a new travel route. For example, the virtual reality transportation system 106 may segment the historical sensory data based on weather or other conditions. To elaborate, the virtual reality transportation system 106 determines whether the historical sensory data includes sensory readings for the travel road under the same road conditions. For instance, if the road is currently wet due to inclement weather, the virtual reality transportation system 106 may determine that, while the historical sensory data contains sensory readings for the travel route under dry conditions, the historical sensory data does not contain sensory readings for the travel route under wet conditions, and that, therefore, the travel is a new travel route under the current conditions. Additional or alternative factors that the virtual reality transportation system 106 may consider include, but are not necessarily limited to, time of day, road construction, time of year (e.g., season), traffic conditions, etc.

In response to determining that the travel route is a new travel route, the virtual reality transportation system 106 provides an indication to the vehicle subsystem 102 to take sensory readings, as illustrated by act 310 of FIG. 3A. In particular, the virtual reality transportation system 106 provides a notification to the vehicle subsystem 102 that the travel route is a new travel route and that the route database 108 does not include sufficient historical sensory data relating to the travel route.

Accordingly, the vehicle subsystem 102 receives the indication from the virtual reality transportation system 106 to take sensory readings. As seen in act 312 of FIG. 3A, the vehicle subsystem 102 takes sensory readings along the travel route to provide to the virtual reality transportation system 106. For instance, as described above, the vehicle subsystem 102 identifies a location of each maneuver along the travel route and takes readings by way of the sensor suite to determine inertial forces that result from each maneuver, as well as that result from road features such as potholes, speedbumps, etc.

The vehicle subsystem 102 provides the sensory reading information (e.g., the sensory data) to the virtual reality transportation system 106. By providing the sensory data, the vehicle subsystem 102 provides the information necessary for the virtual reality transportation system 106 to record historical sensory data for the particular new travel route. Additionally, in some embodiments, other ride information and/or metadata may be tracked and provided along with the sensory data including road conditions, weather, traffic levels, time, number of passengers, passenger identifier, and/or any other suitable information or conditions specific to the recorded sensory data that may affect the accuracy of the inertial forces on future passengers during future rides.

Furthermore, the virtual reality transportation system 106 adds the sensory reading information (e.g., the sensory data) received from the vehicle subsystem 102 to the historical sensory database (e.g., the route database 108), as illustrated by act 316 of FIG. 3A. The virtual reality transportation system 106 creates an entry for the new travel route within the route database 108 and records sensory data for the new travel route as described above.

In addition to adding the sensory data to the route database 108, FIG. 3A illustrates that the virtual reality transportation system 106 identifies a substitute travel route similar to the new travel route, as depicted by act 318. In particular, the virtual reality transportation system 106 accesses the route database 108 and analyzes the roads and the maneuvers of each travel route to identify a previous travel route within the route database 108 that shares similar traits with the new travel route. For example, the virtual reality transportation system 106 identifies a travel route from another country that has similar maneuvers that occur at similar locations/timing along the previous travel route to the new the maneuvers of the new travel route.

To illustrate, the virtual reality transportation system 106 analyzes the new travel route to identify each maneuver and measure each portion of the travel route. Based on the analysis of the new travel route, the virtual reality transportation system 106 analyzes the historical information stored within the route database 108 to identify another travel route therein that is within a threshold similarity of the new travel route. In some cases, a threshold similarity refers to a rating scale (e.g., from one to ten, zero to one hundred, etc.) or a comparison against other travel routes within the route database 108. Accordingly, in some embodiments, the virtual reality transportation system 106 may analyze each previous travel route as a whole and compare each previous travel route with the new travel route to determine whether the maneuvers of the previous travel route and the maneuvers of the new travel route are within a threshold distance of each other. In addition, the virtual reality transportation system 106 determines whether the previous travel routes and the new travel route are within a threshold distance from start to finish, are within an expected total transit time, etc. By comparing the maneuvers and other route traits (e.g., distance, timing, etc.), the virtual reality transportation system 106 determines which previous travel routes are within a threshold similarity of the new travel route (e.g., an 85% match or greater) and identifies one of the previous travel routes that is the most similar (e.g., a 95% match) as a substitute travel route.

Though not illustrated in FIG. 3A, the virtual reality transportation system 106 may, in some embodiments, cobble historical sensory data together instead of, or in addition to, identifying a substitute travel route. For instance, the route database 108 may contain historical sensory data from multiple previous travel routes that include portions therein that coincide with portions of the new travel route. In these cases, the virtual reality transportation system 106 recognizes the shared portions between the new travel route and previous travel routes and utilizes the historical sensory data associated with the shared portions to predict inertial forces of the new travel route. By taking historical sensory data from pieces of multiple previous travel routes and assembling them to represent the new travel route, the virtual reality transportation system 106 constructs an inertial model of the forces that the passenger 116a will experience while traveling with the vehicle subsystem 102 along the new travel route.

Continuing the sequence 300 to FIG. 3B, the sequence 300 further includes an act 320 which illustrates that the virtual reality transportation system 106 analyzes the historical sensory data associated with the substitute travel route. Similar to the discussion of FIG. 2 where the virtual reality transportation system 106 analyzes the historical sensory data for the travel route, the virtual reality transportation system 106 analyzes the historical sensory data within the route database 108 associated with the substitute travel route. To illustrate, since the substitute travel route is within a threshold similarity of the new travel route, the virtual reality transportation system 106 substitutes the historical sensory data relating to inertial forces, speeds, etc., for the substitute travel and attributes the data to the new travel route to predict inertial forces that the passenger 116a will experience while riding in the vehicle subsystem 102. Thus, the virtual reality transportation system 106 is more efficient than some conventional systems. In other words, because the virtual reality transportation system 106 can substitute sensory data between routes associated with the virtual reality transportation system 106, the virtual reality transportation system 106 thereby alleviates the data storage and processing burden of sensing and storing inertial forces for each route associated with the virtual reality transportation system 106.

As mentioned, and as illustrated in FIG. 3B, the virtual reality transportation system 106 predicts inertial forces for the new travel route based on the inertial forces of the substitute travel route, as depicted by act 322. In particular, act 322 may include the virtual reality transportation system 106 using the exact inertial forces of the substitute travel route. In other cases, however, the virtual reality transportation system 106 identifies those differences (whether they are subtle or more pronounced) between the substitute travel route and the new travel route and compensates for those differences. For instance, to compensate for differences between the substitute travel route and the new travel route, the virtual reality transportation system 106 determines, based on the analysis of the historical sensory data, how a sharper turn, a longer straight stretch, denser traffic, etc. affects inertial forces. Then, the virtual reality transportation system 106 adjusts the predictions of the inertial forces for the new travel route accordingly. Thus, in cases where the new travel route has a sharper turn in one place than does the substitute travel route, the virtual reality transportation system 106 predicts a greater inertial force that will act upon the passenger 116a.

In any case, the virtual reality transportation system 106 predicts the inertial forces for the new travel route based on the inertial forces of the substitute travel route to at least generate an inertial map that is a close approximation of the actual inertial forces that the passenger 116a will experience while riding with the vehicle subsystem 102 along the travel route.

Additionally, similar to the discussion provided above with reference to FIG. 2, the virtual reality transportation system 106 generates a virtual reality experience, as illustrated by act 324 of FIG. 3B. In particular, the virtual reality transportation system 106 generates the virtual reality experience to include virtual inertial interactions based on the predicted inertial forces for the new travel route. As described above, the virtual inertial interactions coincide with predicted inertial forces along the new travel route to give the passenger 116a the impression that the virtual inertial interactions cause any actual inertial forces that the passenger 116a experiences.

As further illustrated by act 326 of FIG. 3B, the virtual reality transportation system 106 provides the virtual reality experience to the passenger client device 112a. For example, the virtual reality transportation system 106 provides a three-dimensional virtual reality environment including virtual inertial interactions where virtual objects or virtual motions appear to cause any actual inertial forces. Accordingly, the passenger client device 112a presents the virtual reality experience to the passenger (e.g., by way of a headset or screen display), as illustrated by act 328 of FIG. 3B.

Figure 4:
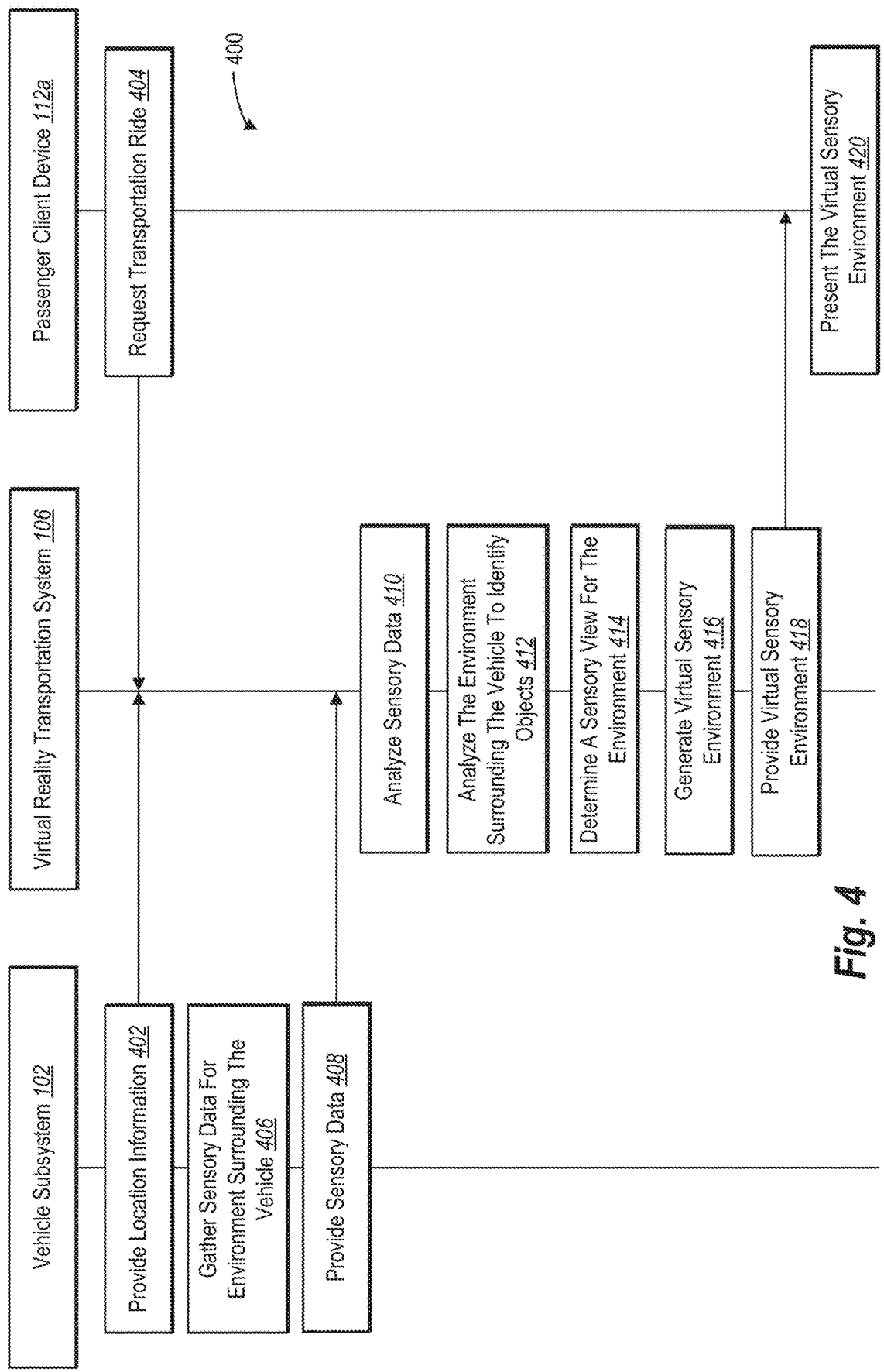
FIG. 4 illustrates a sequence diagram for presenting a virtual reality sensory view of the surroundings of a transportation vehicle in accordance with one or more embodiments.

FIG. 4 illustrates a sequence 400 of acts performed by the vehicle subsystem 102, the virtual reality transportation system 106, and/or the passenger client device 112a. In particular, as illustrated by FIG. 4, the vehicle subsystem 102 provides location information to the virtual reality transportation system 106, as depicted by act 402. As discussed above, the vehicle subsystem 102 determines a location by way of a GPS locator device within the sensor suite 103 or elsewhere, and provides the location information in the form of GPS coordinates, a street address, or other form to the virtual reality transportation system 106.

Additionally, the passenger client device 112a provides location information to the virtual reality transportation system 106, as depicted by act 404 of FIG. 4. In particular, and as discussed above, the passenger client device 112a includes a GPS device by which the passenger client device 112a determines a location of the passenger 116a. The passenger client device 112a then transmits the GPS location information to the virtual reality transportation system 106.

As illustrated by FIG. 4, the virtual reality transportation system 106 receives the location information from the vehicle subsystem 102 and the passenger client device 112a. In addition to providing the location information to the virtual reality transportation system 106, the vehicle subsystem 102 gathers sensory data for the environment surrounding the vehicle subsystem 102, as depicted by act 406 of FIG. 4. In other words, the vehicle subsystem takes sensory reading via the sensor suite 103. By taking sensory readings, the vehicle subsystem 102 maps the environment or area surrounding the vehicle subsystem 102. For instance, by using a LIDAR sensor, the vehicle subsystem 102 identifies objects (e.g., buildings, people, roads, sidewalks, road signs, etc.) within certain radius of the vehicle subsystem 102.

Not only does the vehicle subsystem 102 gather sensory data for the surrounding environment, but in the case where the vehicle subsystem 102 is an autonomous vehicle, the vehicle subsystem 102 also generates a sensory map of the environment to guide an onboard computer navigation system through navigation of the travel route. In particular, the vehicle subsystem 102 can self-drive the travel route based on the generated sensory map that the vehicle subsystem creates from the sensory data.

As illustrated in FIG. 4, the vehicle subsystem 102 further provides the sensory data (e.g., the sensory readings relating to the identified objects within the surrounding environment and/or the generated sensory map) to the virtual reality transportation system 106, as shown by act 408. Indeed, as described above, the vehicle subsystem 102 communicates with the virtual reality transportation system 106 to transfer or otherwise transmit the sensory data (e.g., by way of network 110).

While in some embodiments the vehicle subsystem 102 analyzes the sensory data to generate a sensory map and identify objects in the surrounding area, in other embodiments the vehicle subsystem 102 does not analyze the sensory data. Instead, the vehicle subsystem 102 gathers the sensory data (act 406) and provides the sensory data (act 408) to the virtual reality transportation system 106 for later analysis by the virtual reality transportation system 106.

In response to receiving the sensory data, the virtual reality transportation system 106 analyzes the sensory data, as shown by act 410 of FIG. 4. More specifically, the virtual reality transportation system 106 analyzes the sensory data to generate a sensory environment map of the area surrounding the vehicle subsystem 102. Particularly, as shown in act 412 of FIG. 4, the virtual reality transportation system 106 analyzes the environment surrounding the vehicle subsystem 102 to identify objects in the surrounding environment, as described above. For example, the virtual reality transportation system 106 identifies buildings, people, roads, sidewalks, road signs, etc., within the surrounding environment and determines that some identified objects are navigable (e.g., roads) and some identified objects are barriers (e.g., buildings, etc.). Accordingly, the virtual reality transportation system 106 generates a sensory map to guide the vehicle subsystem 102 through navigation of the travel route.

In addition, the virtual reality transportation system 106 determines or generates a sensory view for the surrounding environment, as depicted by act 414 of FIG. 4. Specifically, based on the sensory map, the virtual reality transportation system 106 generates a three-dimensional virtual rendition of each object within the sensory data that the vehicle subsystem 102 identifies by way of the sensor suite 103. The sensory view generally refers to a depiction of each object within the area surrounding the vehicle subsystem 102 and portrays the objects (e.g., buildings, people, roads, etc.) within the surrounding area as the sensor suite 103 would "see" them—i.e., as sensory readings.

As illustrated by act 416 in FIG. 4, the virtual reality transportation system 106 generates a virtual sensory environment. In particular, based on the sensory view, the virtual reality transportation system 106 generates a three-dimensional, immersive virtual reality environment for presentation to the passenger 116a. To illustrate, the virtual reality transportation system 106 generates a three-dimensional depiction of the environment surrounding the vehicle subsystem 102 based on the sensory readings of the sensor suite 103, where the three-dimensional depiction portrays the environment as sensory readings. Additionally, the virtual reality transportation system 106 generates three-dimensional virtual objects at places within the virtual reality environment that are commensurate with the location of buildings, roads, people, etc., within the real world. Accordingly, the virtual reality transportation system 106 generates a virtual sensory environment that includes a three-dimensional sensory-based depiction of the vehicle subsystem's 102 surroundings.

The virtual reality transportation system 106 further provides the virtual sensory environment to the passenger client device 112a, as shown by act 418 of FIG. 4. In particular, as described above with reference to FIGS. 2 and 3A-3B, the virtual reality transportation system 106 communicates with the passenger client device 112a by way of network 110 to transmit the virtual sensory environment (including the sensory views of the objects therein) to the passenger client device 112a. In some embodiments, the virtual reality transportation system 106 may not generate the virtual sensory environment as described above, but may instead provide instructions to the passenger client device 112a to generate the virtual sensory environment in accordance with the above description.

In response to receiving the virtual sensory environment as shown in FIG. 4, the passenger client device 112a presents the virtual sensory environment to the passenger 116a. For instance, the passenger client device 112a presents a display of the virtual sensory environment to the passenger 116a by way of a headset or other display screen. Accordingly, the passenger 116a views the virtual sensory environment in an immersive experience where the passenger 116a sees the area surrounding the vehicle subsystem 102 just as the vehicle subsystem 102 itself "sees" the area by way of its sensor suite 103. Additional detail regarding the presentation and appearance of the virtual sensory environment as well as the virtual reality environment described above is provided below with reference to FIGS. 5-7.

Figure 5:
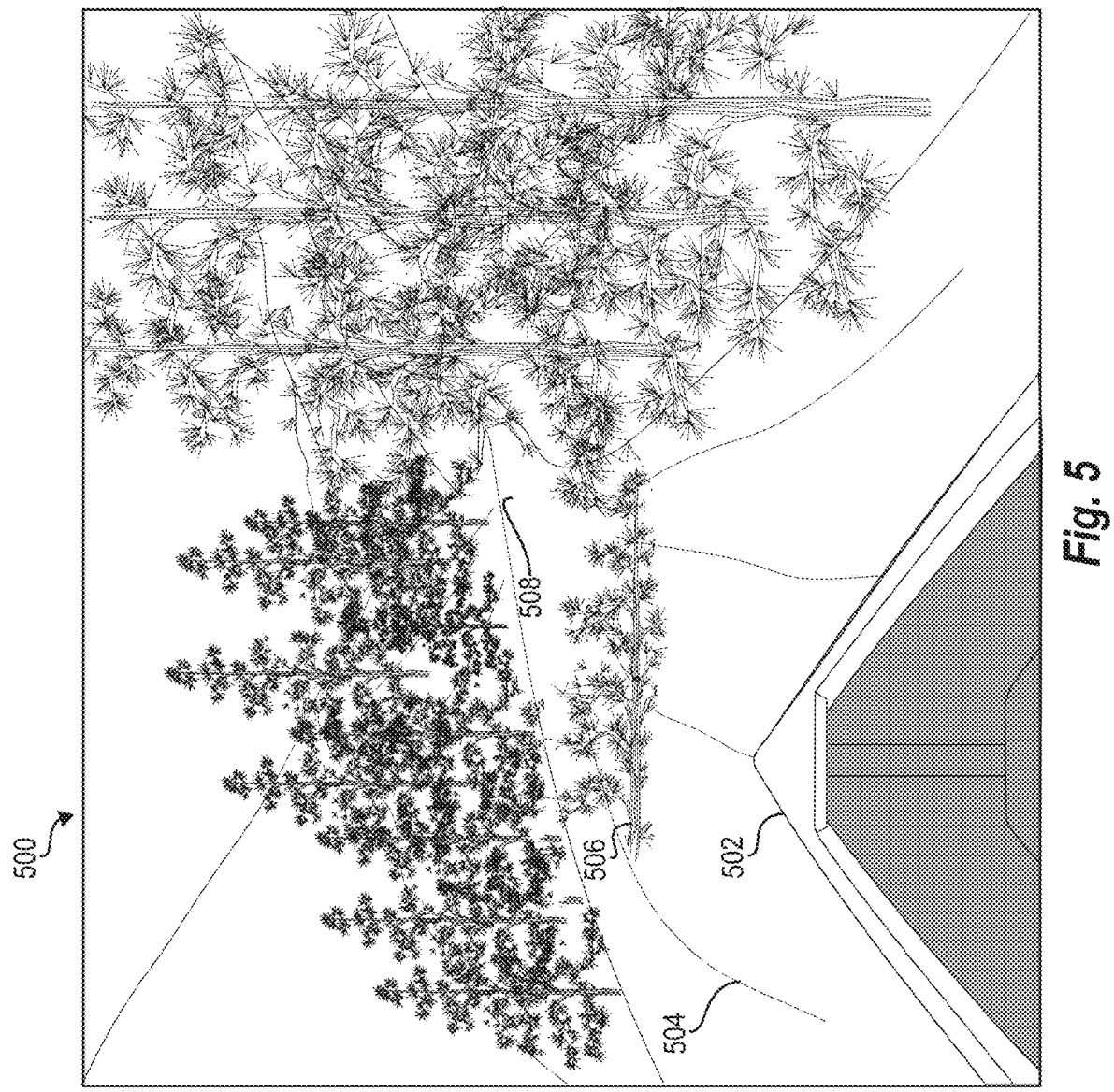
FIG. 5 illustrates an example virtual reality experience from a passenger perspective in accordance with one or more embodiments.

FIG. 5 illustrates a virtual reality environment 500 from the perspective of the passenger 116a (e.g., as the passenger 116a views through the passenger client device 112a). In particular, the virtual reality environment 500 includes virtual objects within a virtual setting of a river scene. The environment 500 of FIG. 5 further includes a representation of one or more virtual interactions that the passenger 116a will experience as the virtual reality environment 500 progresses through the experience as the vehicle subsystem 102 navigates the travel route. To illustrate from FIG. 5, the environment 500 includes a boat 502, a section of the river with a fast current 504, a fallen tree 506, and a section of river with a slow current 508.

As shown in FIG. 5, the environment 500 includes a boat 502. In particular, the boat 502 is a virtual representation of the transportation vehicle of the vehicle subsystem 102 that the passenger 116a rides in while watching the virtual reality environment 500. As the vehicle subsystem 102 navigates along the travel route, the boat 502 floats down the river. Furthermore, as described above, the river may include turns, smooth sections, bumpy sections, etc., to create virtual inertial interactions that coincide with predicted inertial forces that the passenger 116a will experience in the real world throughout the travel route. For example, a turn in the river may take place just as the vehicle subsystem 102 makes a turn along the travel route, and a bumpy section of water in the river may take place as the vehicle subsystem 102 navigates a dirt or gravel road along the travel route.

As further shown in FIG. 5, the virtual reality environment 500 also includes a section of fast current 504. In particular, the section of fast current 504 may represent a section of the travel route where the vehicle subsystem 102 navigates along a highway or interstate, or where there is relatively little traffic and the driving is faster. Accordingly, as the vehicle subsystem 102 drives faster, the boat 502 moves more quickly along the fast current 504 within the environment 500, thus giving the passenger 116a the impression that the feeling of driving fast comes from the virtual experience within the boat 502.

The virtual reality environment 500 of FIG. 5 further includes a fallen tree 506. The fallen tree 506 represents a virtual inertial interaction corresponding to a real-world inertial force caused by an object or road trait such as, for example, a speedbump or a pothole. To illustrate, the virtual reality transportation system 106 predicts an inertial force that the passenger 116a will experience during the travel route. The prediction is based on historical sensory data, as described above, where previous vehicle subsystems have recording an inertial force at a particular location along the travel route due to a speedbump, for example. Thus, the virtual reality transportation system 106 generates a virtual inertial interaction within the virtual reality environment 500 so that, when the vehicle subsystem 102 crosses the speedbump, the passenger 116a will experience a bumping motion that appears to be the result of the boat 502 crossing over the fallen tree 506 in the river.

FIG. 5 also includes a section of the river with a slow current 508. Similar to the description provided above with relation to the fast current 504, the virtual reality environment 500 also includes a section of slow current 508 to represent an event in the real world where the vehicle subsystem 102 moves slower. To illustrate, in areas where the traffic is historically thicker or where the speed limit is slower, the virtual reality transportation system 106 predicts that the passenger 116a will experience a slow forward motion within the vehicle subsystem 102. Thus, the virtual reality transportation system 106 generates a virtual inertial interaction to represent the slower motion where, when the boat 502 floats down the slow current 508, the passenger 116a has the impression that the slower movement of the boat 502 causes the sensation of slow forward motion that actually occurs as a result of the slower movement of the vehicle subsystem 102.

While FIG. 5 illustrates one example virtual reality environment 500, it will be understood from the disclosure herein that various other virtual reality environments are possible to provide different virtual reality experiences to the passenger 116a. For instance, the virtual reality transportation system 106 need not only provide a river scene, but may alternatively provide a virtual rendition of a car chase scene, a virtual roller coaster ride, a virtual spaceship ride, etc.

Figure 6:
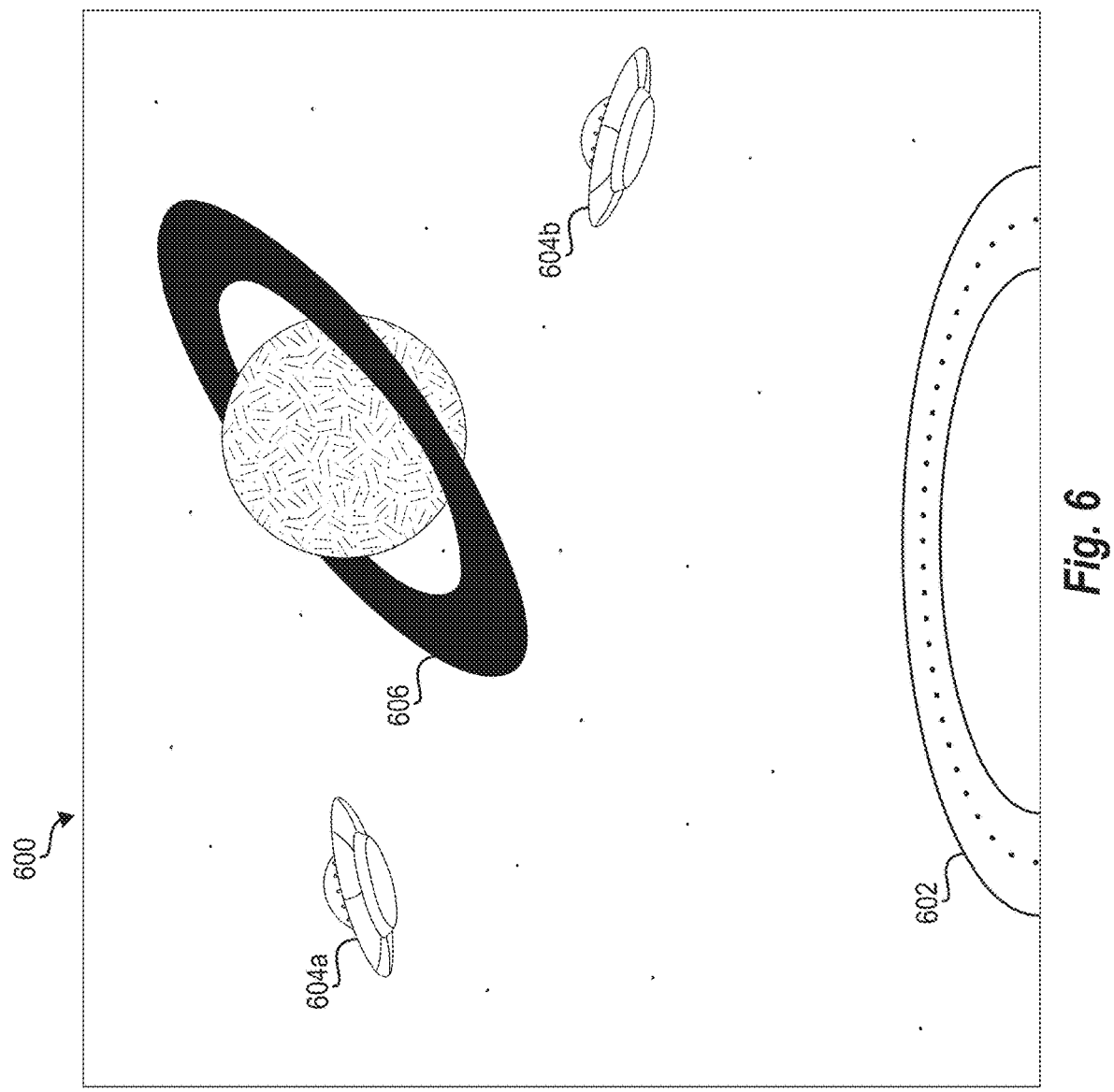
FIG. 6 illustrates another example virtual reality experience from a passenger perspective in accordance with one or more embodiments.

FIG. 6 illustrates a virtual reality environment 600 of a view of outer space. In particular, the virtual reality environment 600 of FIG. 6 includes a representation of the vehicle subsystem 102 as a spaceship 602 in addition to a representation of other vehicle subsystems associated with the virtual reality transportation system 106 as spaceships 604a and 604b (referred to herein collectively as "spaceships 604"). The environment 600 further includes a planet 606 that represents an object within the real world such as, for example, the desired destination of the passenger 116a.

To illustrate from FIG. 6, the spaceship 602 represents the vehicle subsystem 102 from the perspective of the passenger 116a as the passenger 116a rides in the vehicle subsystem 102 along the travel route. As the vehicle subsystem 102 navigates the travel route, the virtual reality transportation system 106 generates virtual inertial interactions to coincide with the predicted inertial forces. The virtual inertial interactions of FIG. 6 may include, but are not necessarily limited to, changes in horizontal direction of the spaceship 602, changes in vertical direction of the spaceship 602, deceleration of the spaceship 602, and/or acceleration of the spaceship 602. Each of the virtual inertial interactions may cause the passenger 116a to perceive that an actual inertial force experienced along the travel route is the result of a virtual inertial interaction of the virtual reality experience.

As shown in FIG. 6, the virtual reality transportation system 106 may identify the location of other vehicle subsystems and represent the locations of the other vehicle subsystems within the environment 600. In particular, as shown in environment 600 of FIG. 6, spaceships 604 represent the locations of other vehicle subsystems relative to the vehicle subsystem 102. In some embodiments, spaceship 604a may appear farther away within the environment 600 when the corresponding vehicle subsystem is farther away from vehicle subsystem 102 in the real world. Likewise, spaceships 604 may move within the environment 600 as the corresponding vehicle subsystems move in real life. In certain embodiments, the virtual reality transportation system 106 generates spaceships 604 to represent other transportation vehicles when the other transportation vehicles are within a threshold distance (e.g., radius) of the vehicle subsystem 102—i.e., as determined based on the location information of each vehicle's GPS device.

In some embodiments, the virtual reality transportation system 106 enables the passenger 116a to interact with passengers of the vehicle subsystems represented by spaceships 604. For example, the virtual reality transportation system 106 may generate a game where passenger 116a and the other passengers can shoot laser guns to tag each other. Accordingly, when another spaceship (e.g., spaceship 604a)

is within view, the passenger 116a can attempt to tag the spaceship 604a with a virtual laser gun. If the passenger 116a orientates the passenger client device 112a (e.g., by looking in a different direction) to center the spaceship 604a within the view of the environment 600, and then the passenger 116a attempts to shoot the laser gun, the virtual reality transportation system 106 may determine that the passenger's 116a aim was true and score a hit for the passenger 116a. The virtual reality transportation system 106 may keep a running tally of the number of hits scored by the passenger 116a throughout the navigation route or even keep a running tally of the number of hits for a passenger account over multiple travel routes.

Figure 7:
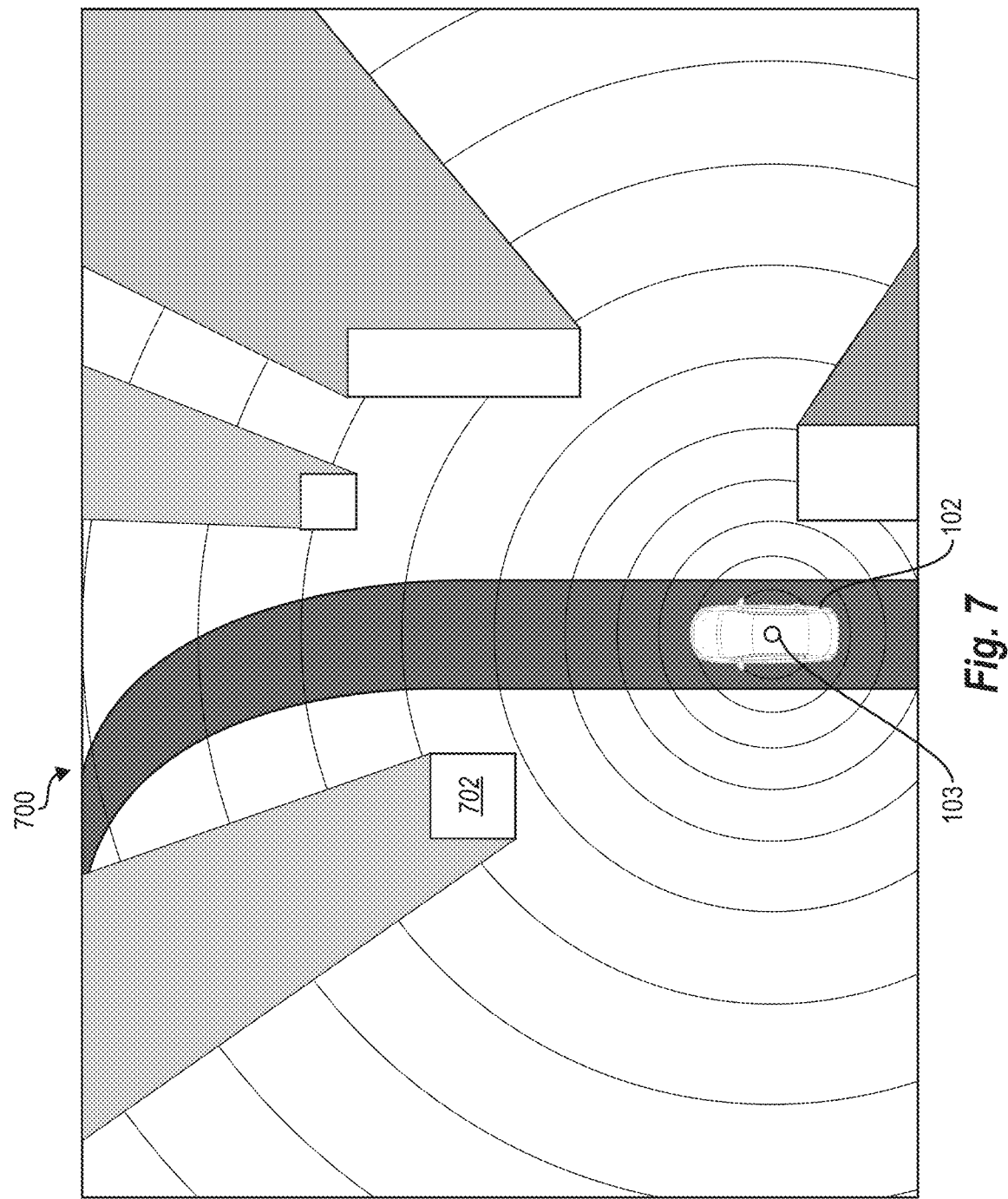
FIG. 7 illustrates an example virtual reality environment of a sensory view from a top-down perspective in accordance with one or more embodiments.

FIG. 7 illustrates a top-down sensory view 700 of the surroundings of the vehicle subsystem 102. In particular, as shown in FIG. 7, the sensory view 700 includes an object 702 as well as a depiction of outward radiating lines to illustrate the sensory perception of the sensor suite 103. As described above, the sensor suite 103 may include a LIDAR sensor that scans the environment around the vehicle subsystem 102 to identify objects therein. Indeed, as shown in FIG. 7, the vehicle subsystem 102 (or the virtual reality transportation system 106, upon receiving sensory data) analyzes the sensory data taken by the sensor suite 103 to identify objects within the environment, such as object 702.

The vehicle subsystem 102 (or the virtual reality transportation system 106, as mentioned), further identifies the bounds of the road and any other objects to avoid to, in the case of an autonomous vehicle subsystem, facilitate self-driving. The vehicle subsystem 102 gathers sensory information to generate a sensory map of the surrounding area to recognize those areas that are navigable and those that are not. Additionally, as shown in FIG. 7, the sensory view 700 illustrates that the sensor suite 103 may not gather sensory information as accurately from areas obscured by objects such as object 702. In any case, the sensory view 700 of FIG. 7 is merely illustrative, and in some embodiments, the vehicle subsystem 102 and/or the virtual reality transportation system 106 may identify objects in much greater detail and with much greater accuracy than depicted in FIG. 7.

While FIG. 7 illustrates a top-down sensory view 700, it will be understood from the disclosure herein that the virtual reality transportation system 106 may provide the top-down sensory view 700 to the passenger client device 112a or else may provide a first-person sensory view from the perspective of the sensor suite 103. Indeed, the top-down sensory view 700 is provided as illustrative of the sensory readings and the identification of objects within the environment surrounding the transportation vehicle 102, and not as representative of the only possible presentation of the sensory view.

Figure 8:
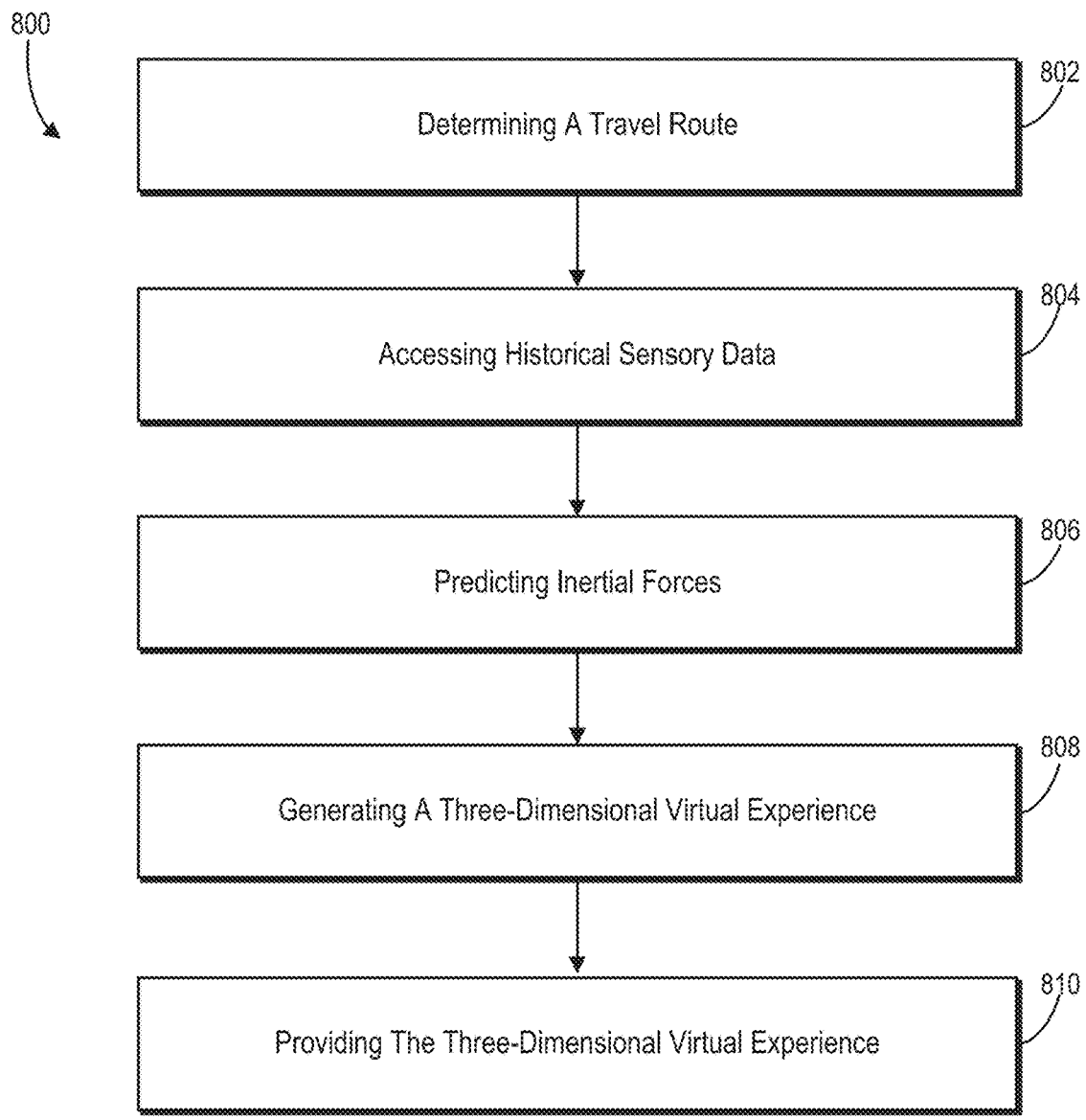
FIG. 8 illustrates a flowchart of a series of acts in a method of providing a virtual reality transportation experience in accordance with one or more embodiments.
Figure 9:
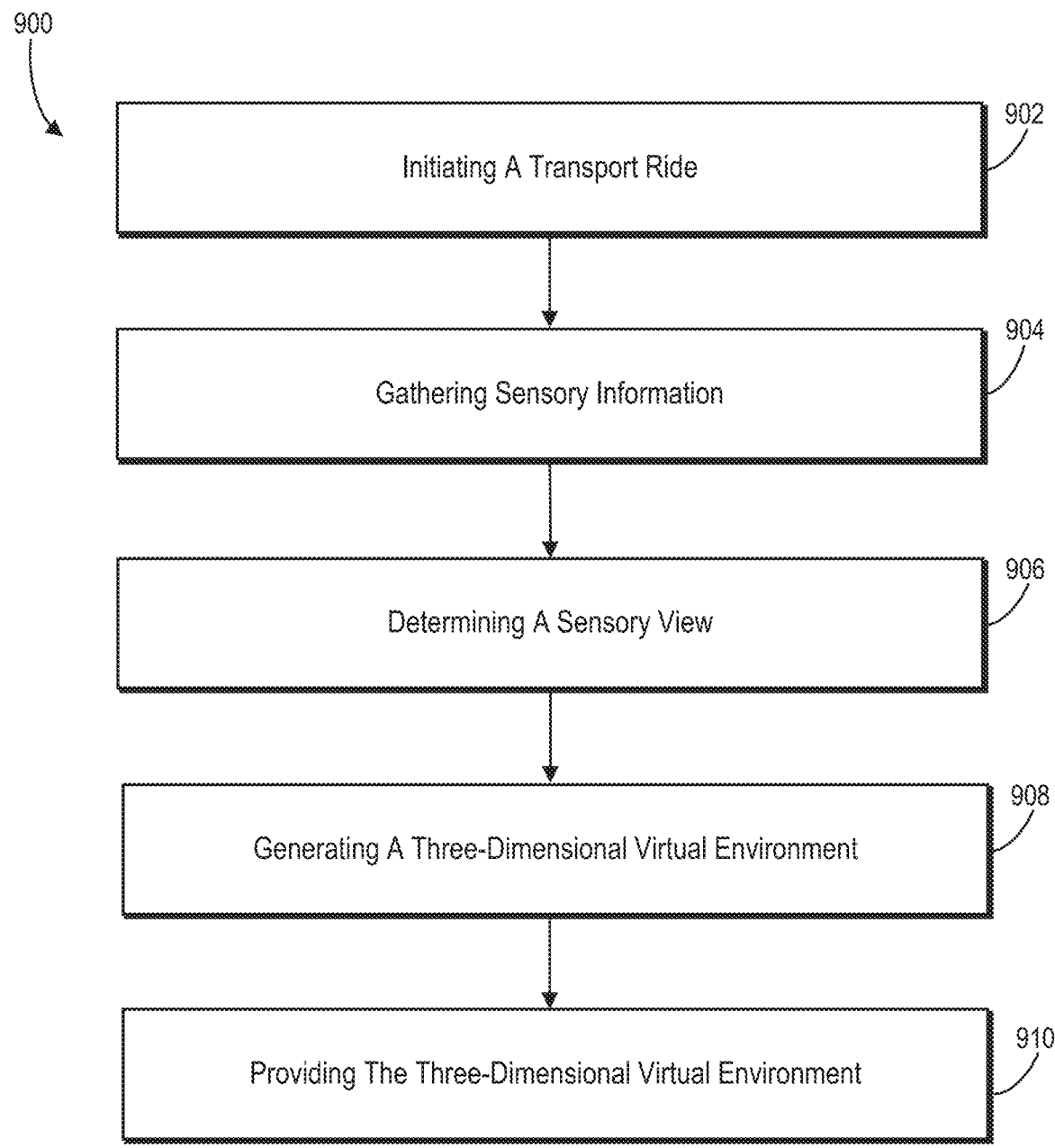
FIG. 9 illustrates a flowchart of a series of acts in a method of providing a virtual reality transportation experience of a sensory view in accordance with one or more embodiments.

FIGS. 1-7, the corresponding text, and the examples provide a number of different systems and methods that manage a virtual reality transportation system. In addition to the foregoing, embodiments can also be described in terms of flowcharts comprising acts and/or steps in a method for accomplishing a particular result. For example, FIGS. 8-9 illustrate flowcharts of exemplary methods in accordance with one or more embodiments. The methods described in relation to FIGS. 8-9 may be performed with fewer or more steps/acts or the steps/acts may be performed in any number of different orders or sequences. Additionally, the steps/acts described herein may be repeated or performed in parallel with one another or in parallel with different instances of the same or other similar steps/acts.

FIG. 8 illustrates a flowchart of a series of acts in a method 800 of providing a three-dimensional virtual experience. For instance, the method 800 can include an act 802 of determining a travel route. In particular, the act 802 can involve determining, by a processor of a transportation system, a travel route for a transportation vehicle to navigate to deliver a passenger to a destination. Additionally, the historical sensory data can include a record, associated with each travel route previously traveled by each transportation vehicle associated with the transportation system, of inertial forces experienced throughout navigation of a given travel route. The historical sensory data can also include readings taken by a sensor suite associated with each transportation vehicle during each travel route associated with the transportation system. In some embodiments, the sensor suite can include a LIDAR sensor, as described above.

The method 800 can also include an act 804 of accessing historical sensory data. In particular, the act 804 can involve accessing, based on the determined travel route, historical sensory data associated with the travel route.

The method 800 can further include an act 806 of predicting inertial forces. In particular, the act 806 can involve predicting, based on the historical sensory data, inertial forces that the passenger will experience while navigating the travel route in the transportation vehicle. In some embodiments, the transportation vehicle is an autonomous transportation vehicle.

Additionally, the method 800 can include an act 808 of generating a three-dimensional virtual experience. In particular, the act 808 can involve generating, based on the predicted inertial forces that the passenger will experience, a three-dimensional virtual experience comprising a plurality of virtual inertial interactions, each of the plurality of virtual inertial interactions corresponding to a predicted inertial force associated with the travel route. The act 808 can also involve generating, for each of the plurality of virtual inertial interactions, a virtual object that appears, by observation through the virtual reality device, to collide with the passenger. Additionally, the act 808 can involve timing a virtual collision of the virtual object with the passenger to cause a perception that the virtual collision results in a predicted inertial force.

Furthermore, the method 800 can include an act 810 of providing the three-dimensional virtual experience. In particular, the act 810 can involve providing, to the passenger by way of a virtual reality device, the generated three-dimensional virtual experience while navigating the travel route to the destination.

The method 800 may further include an act of determining that the travel route is a new travel route on which the transportation system has incomplete historical sensory data. The method 800 may include an act of, in response to determining that the travel route is a new travel route, providing an instruction to the sensor suite associated with the transportation vehicle to take sensory readings during navigation of the travel route, as well as adding the sensory readings associated with the new travel route to the historical sensory data. Additionally, the method 800 can include an act of identifying, within a database of the transportation system, a substitute travel route on which the transportation system has complete historical sensory data, wherein the substitute travel route has attributes within a threshold similarity of the new travel route.

Additionally, the method 800 may include an act of identifying a first plurality of maneuvers within the new travel route and a second plurality of maneuvers within the substitute travel route, as well as an act of determining that the substitute travel route has attributes within the threshold similarity of the new travel route by analyzing the first plurality of maneuvers and the second plurality of maneuvers. Still further, the method 800 may include an act of predicting, based on the historical data associated with substitute travel route, inertial forces that the passenger will experience while navigating the new travel route within the transportation vehicle. The method 800 may even further include an act of generating, based on the predicted inertial forces that the passenger will experience while navigating the new travel route, one or more new virtual inertial interactions, each of the one or more new virtual inertial interactions corresponding to a predicted inertial force associated with the new travel route.

In addition, the method 800 may include an act of providing an indication to start a presentation of the generated three-dimensional virtual experience when the transportation vehicle begins driving to the destination after picking up the passenger, as well as an act of providing an indication to end the presentation of the generated three-dimensional virtual experience when the transportation vehicle stops to drop of the passenger at the destination.

Furthermore, the method 800 may include an act of identifying a location of a plurality of transportation vehicles associated with the transportation system, and may also include an act of generating a plurality of virtual elements corresponding to the plurality of transportation vehicles to include within the three-dimensional virtual experience. In addition, the method 800 may include an act of providing an option to share the generated three-dimensional virtual experience with another passenger.

FIG. 9 illustrates a flowchart of a series of acts in a method 900 of generating and providing a three-dimensional virtual environment. For example, the method 900 can include an act 902 of initiating a transport ride. In particular, the act 902 can involve initiating a transport ride for a passenger by way of an autonomous transportation vehicle.

The method 900 can include an act 904 of gathering sensory information. In particular, the act 904 can involve gathering, by way of a sensor suite associated with the autonomous transportation vehicle, sensory information from an environment surrounding the autonomous transportation vehicle. Gathering the sensory information can include scanning the environment surrounding the autonomous transportation vehicle by way of a LIDAR sensor.

Based on gathering the sensory information, the method 900 can include an act 906 of determining a sensory view. In particular, the act 906 can involve determining a sensory view of the environment surrounding the autonomous transportation vehicle.

Additionally, and also based on gathering the sensory information, the method 900 can also include an act 908 of generating a three-dimensional virtual environment. In particular, the act 908 can involve generating a three-dimensional virtual environment that includes the sensory view of the environment surrounding the autonomous transportation vehicle. The act 908 can further involve incorporating mapping data (e.g., from a third-party mapping service) to more accurately determine size, shape, and locations of buildings or other objects for generating within the three-dimensional virtual environment.

The method 900 can also include an act 910 of providing the three-dimensional virtual environment. In particular, the act 910 can involve providing, to the passenger by way of a virtual reality device, the generated three-dimensional virtual environment.

Furthermore, the method 900 can include an act of analyzing the environment surrounding the autonomous transportation vehicle to identify one or more objects within the environment, wherein the sensory view of the environment surrounding the autonomous vehicle includes a sensory representation of each of the one or more objects identified within the environment.

The method 900 can still further include an act of providing, to the passenger by way of the virtual reality device, an option to share the generated three-dimensional virtual environment with another passenger.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
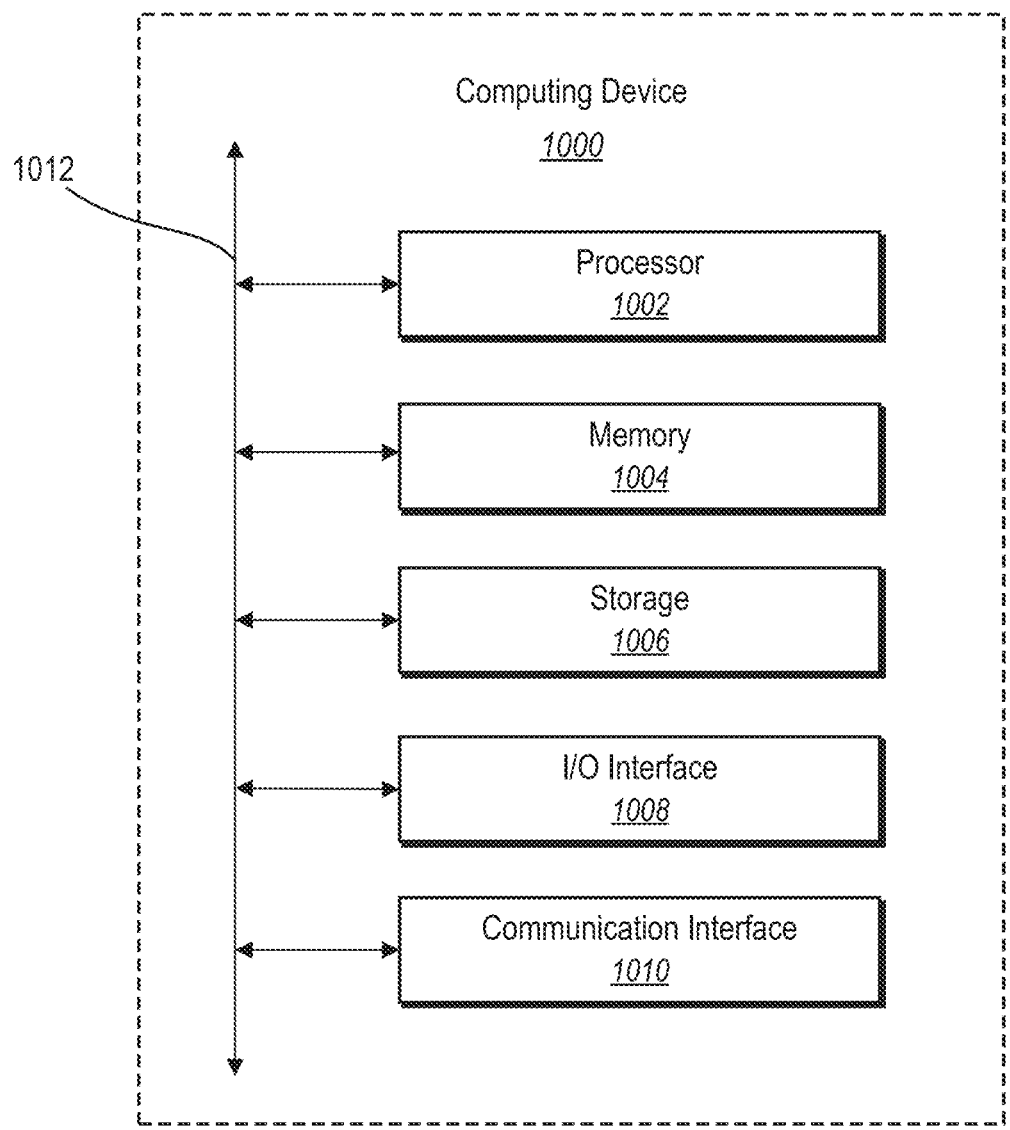
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the Virtual reality transportation system 106 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

Figure 11:
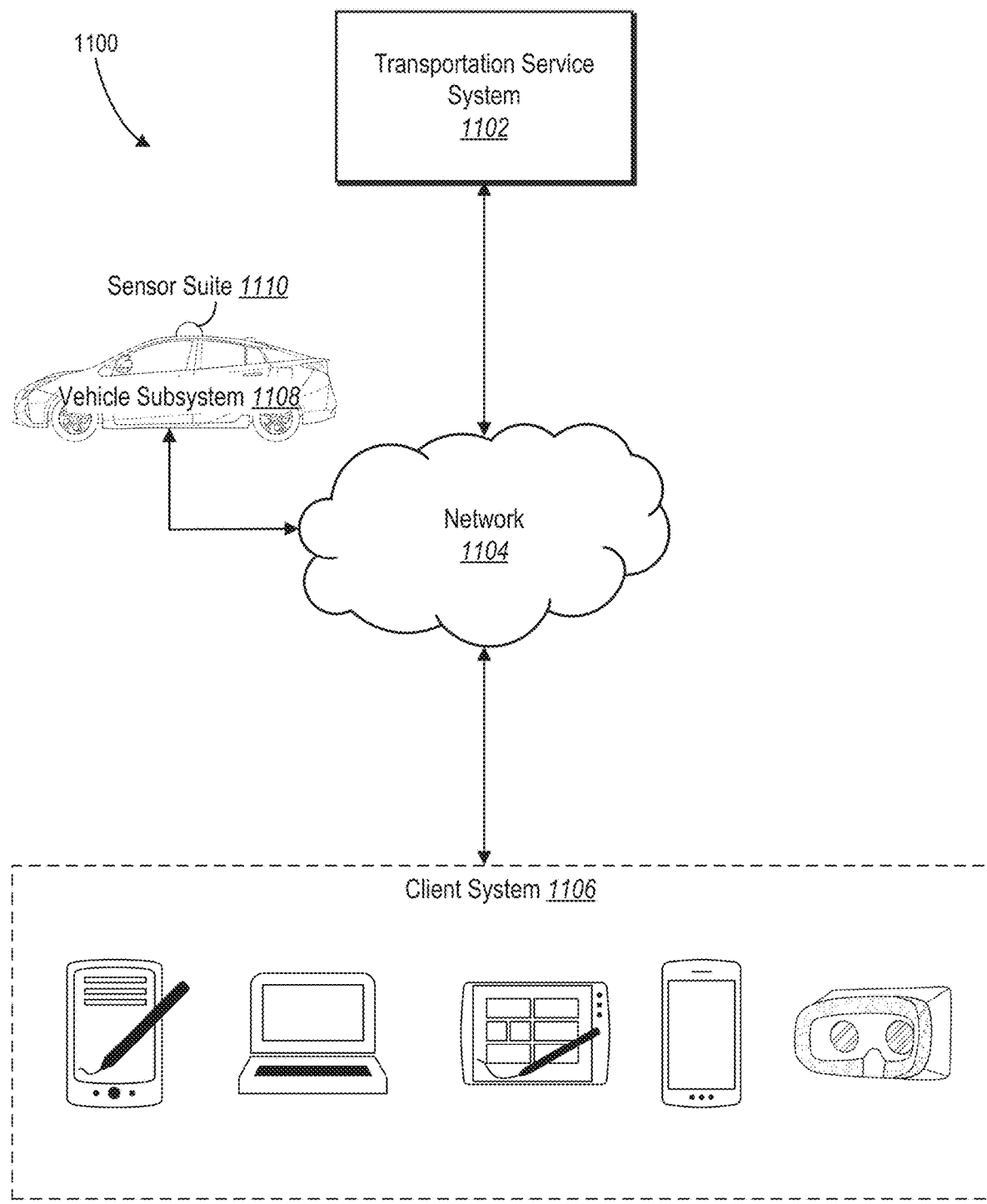
FIG. 11 illustrates an example virtual reality transportation system in accordance with one or more embodiments.

FIG. 11 illustrates an example network environment 1100 of a virtual reality transportation system. The network environment 1100 represents an example environment for virtual reality transportation system 106, discussed above and illustrated in FIG. 1. Network environment 1100 includes a client system 1106, a transportation service system 1102, and a vehicle subsystem 1108 connected to each other by a network 1104. Although FIG. 11 illustrates a particular arrangement of client system 1106, transportation service system 1102, vehicle subsystem 1108, and network 1104, this disclosure contemplates any suitable arrangement of client system 1106, transportation service system 1102, vehicle subsystem 1108, and network 1104. As an example, and not by way of limitation, two or more of client system 1106, transportation service system 1102, and vehicle subsystem 1108 communicate directly, bypassing network 1104. As another example, two or more of client system 1106, transportation service system 1102, and vehicle subsystem 1108 may be physically or logically co-located with each other in whole or in part. Moreover, although FIG. 11 illustrates a particular number of client systems 1106, transportation service systems 1102, vehicle subsystems 1108, and networks 1104, this disclosure contemplates any suitable number of client systems 1106, transportation service systems 1102, vehicle subsystems 1108, and networks 1104. As an example, and not by way of limitation, network environment 1100 may include multiple client system 1106, transportation service systems 1102, vehicle subsystems 1108, and networks 1104.

This disclosure contemplates any suitable network 1104. As an example, and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client system 1106, transportation service system 1102, and vehicle subsystem 1108 to communication network 1104 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client system 1106 may be an electronic device including hardware, software, or embedded logic components or a combination of two or more such components and capable of carrying out the appropriate functionalities implemented or supported by client system 1106. As an example, and not by way of limitation, a client system 1106 may include any of the computing devices discussed above in relation to FIG. 10. A client system 1106 may enable a network user at client system 1106 to access network 1104. A client system 1106 may enable its user to communicate with other users at other client systems 1106.

In particular embodiments, client system 1106 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1106 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 1106 one or more Hyper Text Markup Language (HTML) files responsive to the HTTP request. Client system 1106 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In other particular embodiments, client system 1106 may include a virtual reality device such as OCULUS RIFT, SAMSUNG GEAR VR, HTC VIVE, GOOGLE CARDBOARD, SONY PLAYSTATION VR, GOOGLE DAYDREAM, or others. Accordingly, the client system 1106 may use virtual three-dimensional rendering technology such as three-dimensional space mapping, multi-projected environments, sensory input, and haptic feedback. Indeed, in some embodiments, the client system 1106 may include a handheld controller or other device to provide vibrations or other haptic feedback to convey virtual interactions as described above.

In particular embodiments, transportation service system 1102 may be a network-addressable computing system that can host a ride share transportation network. Transportation service system 1102 may generate, store, receive, and send data, such as, for example, user-profile data, concept-profile data, text data, ride request data, GPS location data, driver data, passenger data, vehicle data, or other suitable data related to the ride share transportation network. This may include authenticating the identity of drivers and/or vehicles who are authorized to provide ride services through the transportation service system 1102. In addition, the transportation service system may manage identities of service requestors such as users/passengers. In particular, the transportation service system may maintain passenger data such as driving/riding histories, personal data, or other user data in addition to navigation and/or traffic management services or other location services (e.g., GPS services).

In particular embodiments, the transportation service system 1102 may manage ride matching services to connect a user/passenger with a vehicle and/or driver. By managing the ride matching services, the transportation service system 1102 can manage the distribution and allocation of vehicle subsystem 102 resources and user resources such as GPS location and availability indicators, as described herein.

Transportation service system 1102 may be accessed by the other components of network environment 1100 either directly or via network 1104. In particular embodiments, transportation service system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation service system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1106, or a transportation service system 1102 to manage, retrieve, modify, add, or delete, the information stored in data store.

In particular embodiments, transportation service system 1102 may provide users with the ability to take actions on various types of items or objects, supported by transportation service system 1102. As an example, and not by way of limitation, the items and objects may include ride share networks to which users of transportation service system 1102 may belong, vehicles why users may request, location designators, computer-based applications that a user may use, transactions that allow users to buy or sell items via the service, interactions with advertisements that a user may perform, or other suitable items or objects. A user may interact with anything that is capable of being represented in transportation service system 1102 or by an external system of a third-party system, which is separate from transportation service system 1102 and coupled to transportation service system 1102 via a network 1104.

In particular embodiments, transportation service system 1102 may be capable of linking a variety of entities. As an example, and not by way of limitation, transportation service system 1102 may enable users to interact with each other or other entities, or to allow users to interact with these entities through an application programming interfaces (API) or other communication channels.

In particular embodiments, transportation service system 1102 also includes user-generated content objects, which may enhance a user's interactions with transportation service system 1102. User-generated content may include anything a user can add, upload, or send to transportation service system 1102. As an example, and not by way of limitation, a user communicates with transportation service system 1102 from a client system 1106. Chats may include data such as chat questions or other textual data, location information, photos, videos, links, music or other similar data or media. Content may also be added to transportation service system 1102 by a third-party through a "communication channel," such as another user's virtual reality device.

In particular embodiments, transportation service system 1102 may include a variety of servers, sub-systems, programs, modules, logs, and data stores. In particular embodiments, transportation service system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation service system 1102 may also include suitable components such as network interfaces, security mechanisms, load balancers, failover servers, management-and-network-operations consoles, other suitable components, or any suitable combination thereof. In particular embodiments, transportation service system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation service system 1102 and one or more client systems 1106. An action logger may be used to receive communications from a web server about a user's actions on or off transportation service system 1102. In conjunction with the action log, a third-party-content-object log may be maintained of user exposures to third-party-content objects. A notification controller may provide information regarding content objects to a client system 1106. Information may be pushed to a client system 1106 as notifications, or information may be pulled from client system 1106 responsive to a request received from client system 1106. Authorization servers may be used to enforce one or more privacy settings of the users of transportation service system 1102. A privacy setting of a user determines how particular information associated with a user can be shared. The authorization server may allow users to opt in to or opt out of having their actions logged by transportation service system 1102 or shared with other systems, such as, for example, by setting appropriate privacy settings. Third-party-content-object stores may be used to store content objects received from third parties. Location stores may be used for storing location information received from client systems 1106 associated with users.

In particular embodiments, the vehicle subsystem 1108 may include sensor suite 1110. For example, the sensor suite 1110 can be mounted on the top of the vehicle subsystem 1108 or else can be located within the interior of the vehicle subsystem 1108. In certain embodiments, the sensor suite 1110 can be located in multiple areas at once—i.e., split up throughout the vehicle subsystem 1108 so that different components of the sensor suite 1110 can be placed in different locations in accordance with optimal operation of the sensor suite 1110. In these embodiments, the sensor suite can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a passenger.

In addition, the vehicle subsystem 1108 can include a human-operated vehicle or an autonomous vehicle. A driver of a human-operated vehicle can perform maneuvers to pick up, transport, and drop off one or more passengers according to the embodiments described herein. In certain embodiments, the vehicle subsystem 1108 can include an autonomous vehicle—i.e., a vehicle that does not require a human operator. In these embodiments, the vehicle subsystem 1108 can perform maneuvers, communicate, and otherwise function without the aid of a human driver, in accordance with available technology.

In particular embodiments, the vehicle subsystem 1108 may include a communication device capable of communicating with the client system 1106 and/or the transportation service system 1102. For example, the vehicle subsystem 1108 can include an on-board computing device communicatively linked to the network 1104 to transmit and receive data such as GPS location information, sensor-related information, passenger location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising, by at least one processor of a transportation system:
    based on determining that historical sensory data associated with a travel route fails to satisfy a historical sensory data threshold, wherein the travel route is associated with at least one maneuver, identifying a at least one other travel route that is similar to the travel route and includes stored historical sensory data that includes one or more maneuvers;
    based on one or more differences between the at least one maneuver and the one or more maneuvers, generating inertial force data for the travel route by modifying the stored historical sensory data associated with the at least one other travel route;
    generating, based on the inertial force data for the travel route, a virtual inertial interaction that is presented via a virtual reality device and that corresponds to the at least one maneuver to be performed by a transportation vehicle while navigating along the travel route; and
    causing the virtual reality device to present the virtual inertial interaction during the at least one maneuver by the transportation vehicle.

2. The method of claim 1, further comprising determining that the historical sensory data associated with the travel route fails to satisfy the historical sensory data threshold by determining that the historical sensory data fails to satisfy the historical sensory data threshold under current road conditions.

3. The method of claim 2, wherein determining that the historical sensory data fails to satisfy the historical sensory data threshold under the current road conditions comprises:
    determining that the current road conditions for the travel route are wet road conditions; and
    determining that the historical sensory data stored for the travel route under wet road conditions fails to satisfy the historical sensory data threshold.

4. The method of claim 2, wherein determining that the historical sensory data fails to satisfy the historical sensory data threshold under the current road conditions comprises determining that the historical sensory data stored for the travel route under current traffic conditions fails to satisfy the historical sensory data threshold.

5. The method of claim 1, wherein identifying the at least one other travel route comprises:
    determining similarity ratings for a plurality of stored travel routes in relation to the travel route; and
    selecting the at least one other travel route from among the plurality of stored travel routes based on determining, from the similarity ratings, that the at least one other travel route is within a threshold similarity in relation to the travel route.

6. The method of claim 5, wherein determining similarity ratings for a plurality of stored travel routes in relation to the travel route comprises comparing the plurality of stored travel routes with the travel route to determine locations and timing of maneuvers along the stored travel routes in relation to locations and timing of the at least one maneuver along the travel route.

7. The method of claim 1, wherein generating the inertial force data for the travel route comprises:
    generating predictions for how the one or more differences between the at least one maneuver and the one or more maneuvers will affect inertial forces that will act upon a passenger; and
    adjusting the stored historical sensory data associated with the at least one other travel route based on the generated predictions.

8. A system comprising:
    at least one processor; and
    a non-transitory computer readable medium comprising instructions that, when executed by the at least one processor, cause the system to:
        based on determining that historical sensory data associated with a travel route fails to satisfy a historical sensory data threshold, wherein the travel route is associated with at least one maneuver, identify at least one other travel route that is similar to the travel route and includes stored historical sensory data that includes one or more maneuvers;
        based on one or more differences between the at least one maneuver and the one or more maneuvers, generate inertial force data for the travel route by modifying the stored historical sensory data associated with the at least one other travel route;
        generate, based on the inertial force data for the travel route, a virtual inertial interaction that is presented via a virtual reality device and that corresponds to the at least one maneuver to be performed by a transportation vehicle while navigating along the travel route; and
        cause the virtual reality device to present the virtual inertial interaction during the at least one maneuver by the transportation vehicle.

9. The system of claim 8, further comprising instructions that, when executed by the at least one processor, cause the system to determine that the historical sensory data associated with the travel route fails to satisfy the historical sensory data threshold by determining that the historical sensory data fails to satisfy the historical sensory data threshold under current road conditions.

10. The system of claim 9, further comprising instructions that, when executed by the at least one processor, cause the system to determine that the historical sensory data fails to satisfy the historical sensory data threshold under the current road conditions by:
- determining that the current road conditions for the travel route are wet road conditions; and
- determining that the historical sensory data stored for the travel route under wet road conditions fails to satisfy the historical sensory data threshold.

11. The system of claim 9, further comprising instructions that, when executed by the at least one processor, cause the system to determine that the historical sensory data fails to satisfy the historical sensory data threshold under the current road conditions by determining that the historical sensory data stored for the travel route under current traffic conditions fails to satisfy the historical sensory data threshold.

12. The system of claim 8, further comprising instructions that, when executed by the at least one processor, cause the system to identify the at least one other travel route by:
- determining similarity ratings for a plurality of stored travel routes in relation to the travel route; and
- selecting the at least one other travel route from among the plurality of stored travel routes based on determining, from the similarity ratings, that the at least one other travel route is within a threshold similarity in relation to the travel route.

13. The system of claim 12, further comprising instructions that, when executed by the at least one processor, cause the system to determine similarity ratings for a plurality of stored travel routes in relation to the travel route by comparing the plurality of stored travel routes with the travel route to determine locations and timing of maneuvers along the stored travel routes in relation to locations and timing of the at least one maneuver along the travel route.

14. The system of claim 8, further comprising instructions that, when executed by the at least one processor, cause the system to generate the inertial force data for the travel route by:
- generating predictions for how the one or more differences between the at least one maneuver and the one or more maneuvers will affect inertial forces that will act upon a passenger; and
- adjusting the stored historical sensory data associated with the at least one other travel route based on the generated predictions.

15. A non-transitory computer readable medium comprising instructions that, when executed by at least one processor, cause a computing device to:
- based on determining that historical sensory data associated with a travel route fails to satisfy a historical sensory data threshold, wherein the travel route is associated with at least one maneuver, identify at least one other travel route that is similar to the travel route and includes stored historical sensory data that includes one or more maneuvers;
- based on one or more differences between the at least one maneuver and the one or more maneuvers, generate inertial force data for the travel route by modifying the stored historical sensory data associated with the at least one other travel route;
- generate, based on the inertial force data for the travel route, a virtual inertial interaction that is presented via a virtual reality device and that corresponds to the at least one maneuver to be performed by a transportation vehicle while navigating along the travel route; and
- cause the virtual reality device to present the virtual inertial interaction during the at least one maneuver by the transportation vehicle.

16. The non-transitory computer readable medium of claim 15, further comprising instructions that, when executed by the at least one processor, cause the computing device to determine that the historical sensory data associated with the travel route fails to satisfy the historical sensory data threshold by determining that the historical sensory data fails to satisfy the historical sensory data threshold under current road conditions.

17. The non-transitory computer readable medium of claim 16, further comprising instructions that, when executed by the at least one processor, cause the computing device to determine that the historical sensory data fails to satisfy the historical sensory data threshold under the current road conditions by:
- determining that the current road conditions for the travel route are wet road conditions; and
- determining that the historical sensory data stored for the travel route under wet road conditions fails to satisfy the historical sensory data threshold.

18. The non-transitory computer readable medium of claim 16, further comprising instructions that, when executed by the at least one processor, cause the computing device to determine that the historical sensory data fails to satisfy the historical sensory data threshold under the current road conditions by determining that the historical sensory data stored for the travel route under current traffic conditions fails to satisfy the historical sensory data threshold.

19. The non-transitory computer readable medium of claim 15, further comprising instructions that, when executed by the at least one processor, cause the computing device to identify the at least one other travel route by:
- determining similarity ratings for a plurality of stored travel routes in relation to the travel route; and
- selecting the at least one other travel route from among the plurality of stored travel routes based on determining, from the similarity ratings, that the at least one other travel route is within a threshold similarity in relation to the travel route.

20. The non-transitory computer readable medium of claim 19, further comprising instructions that, when executed by the at least one processor, cause the computing device to determine similarity ratings for a plurality of stored travel routes in relation to the travel route by comparing the plurality of stored travel routes with the travel route to determine locations and timing of maneuvers along the stored travel routes in relation to locations and timing of the at least one maneuver along the travel route.

* * * * *